E. E. WINKLEY.
CUTTING MACHINE.
APPLICATION FILED JUNE 30, 1910.

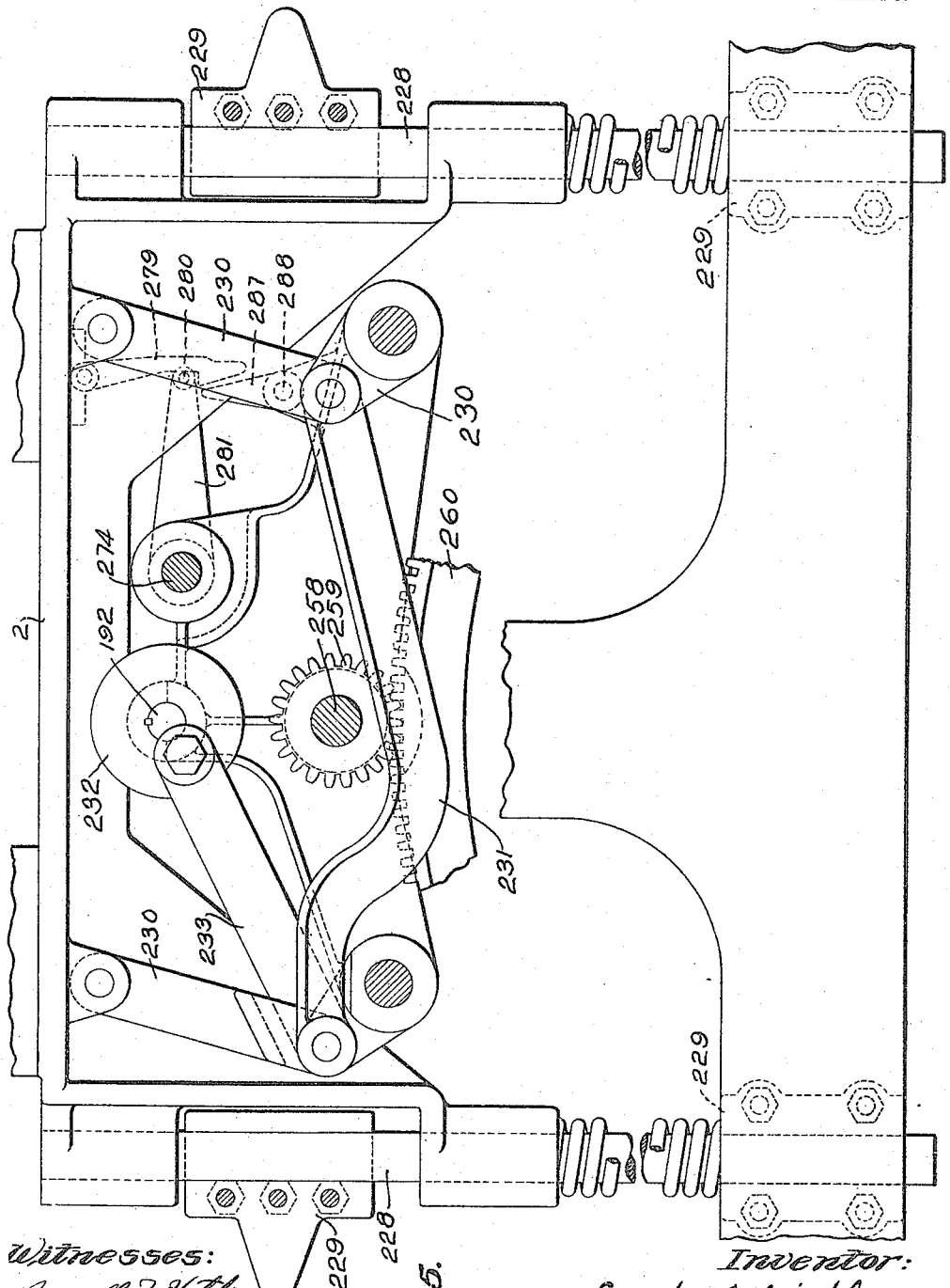

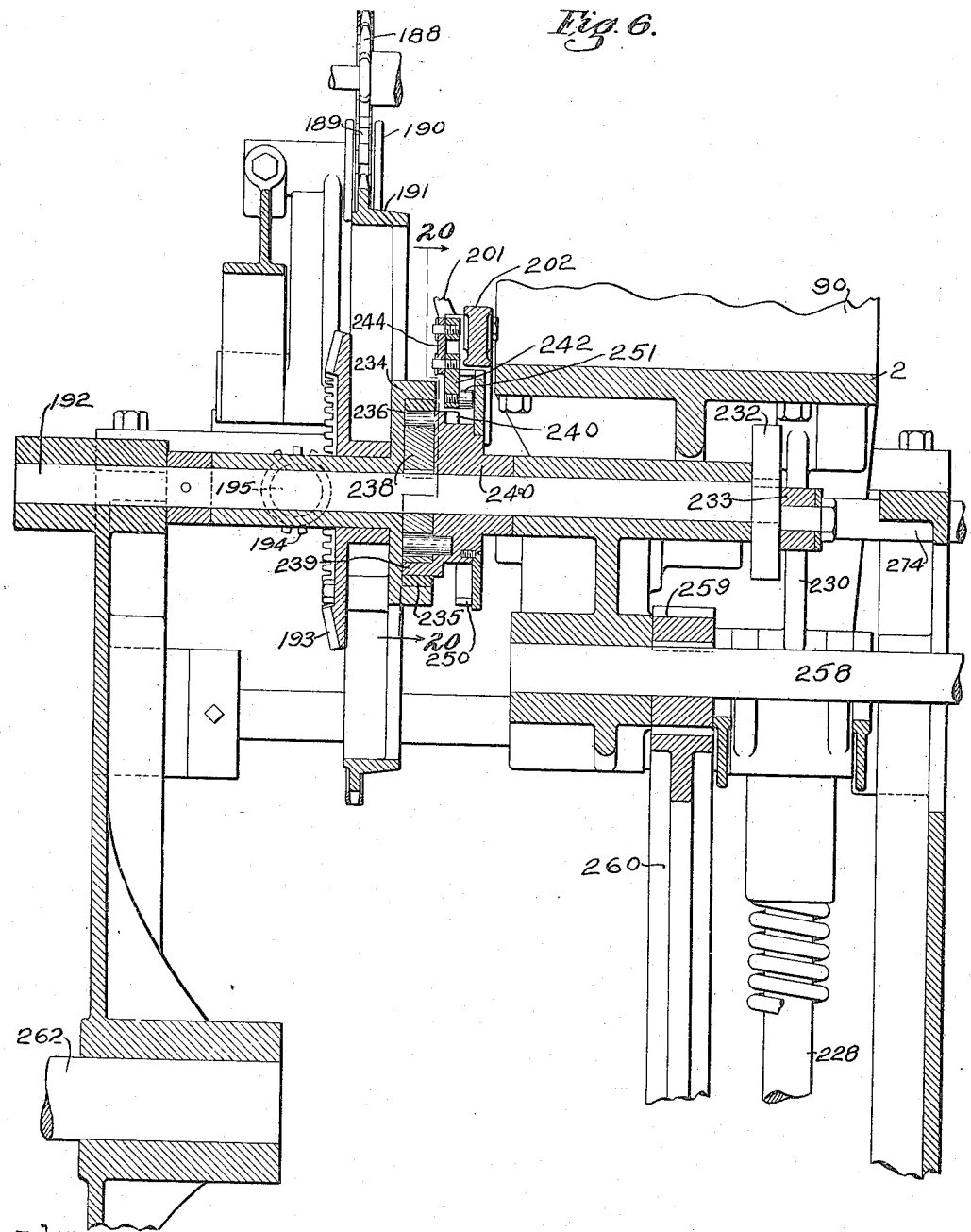

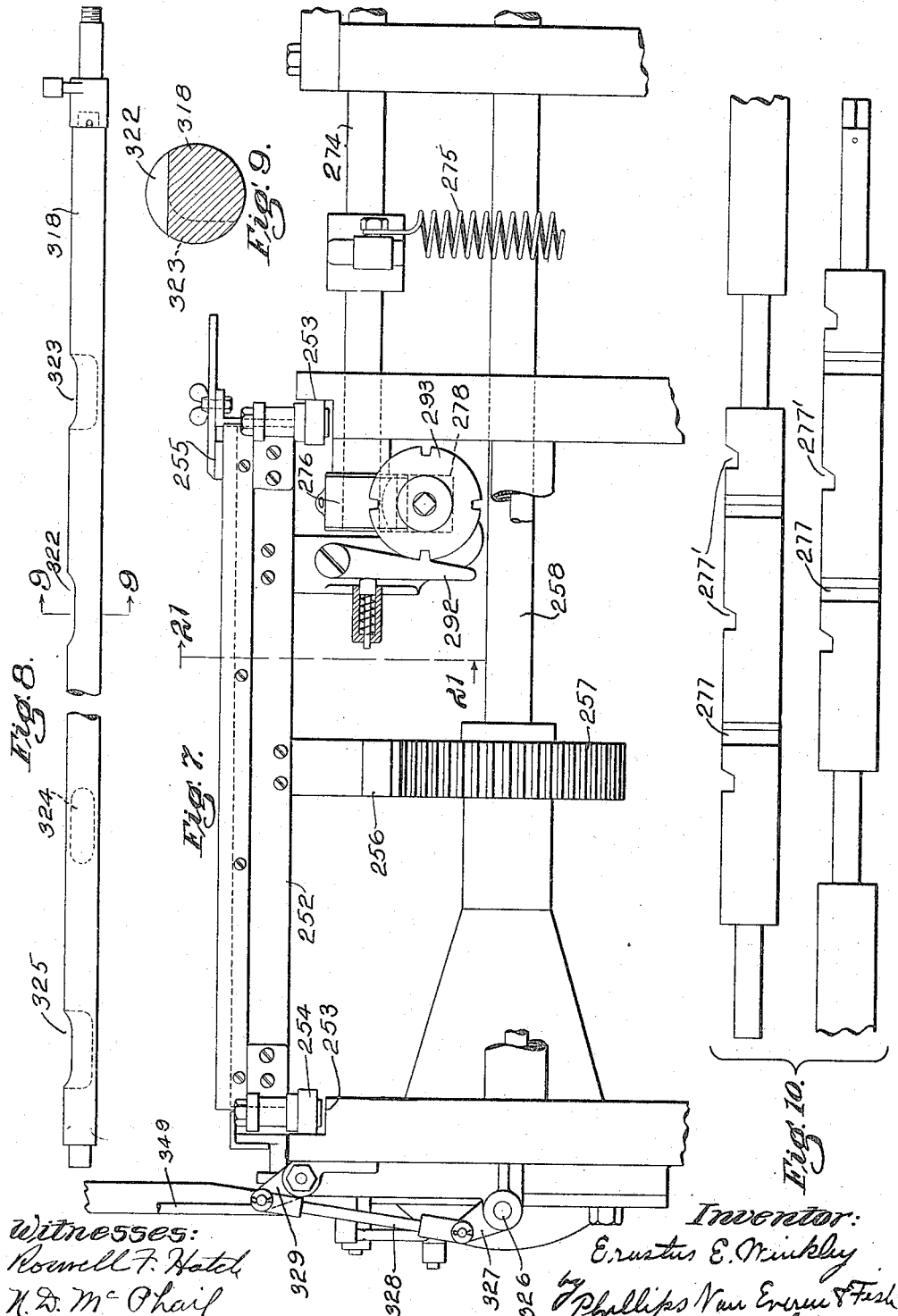

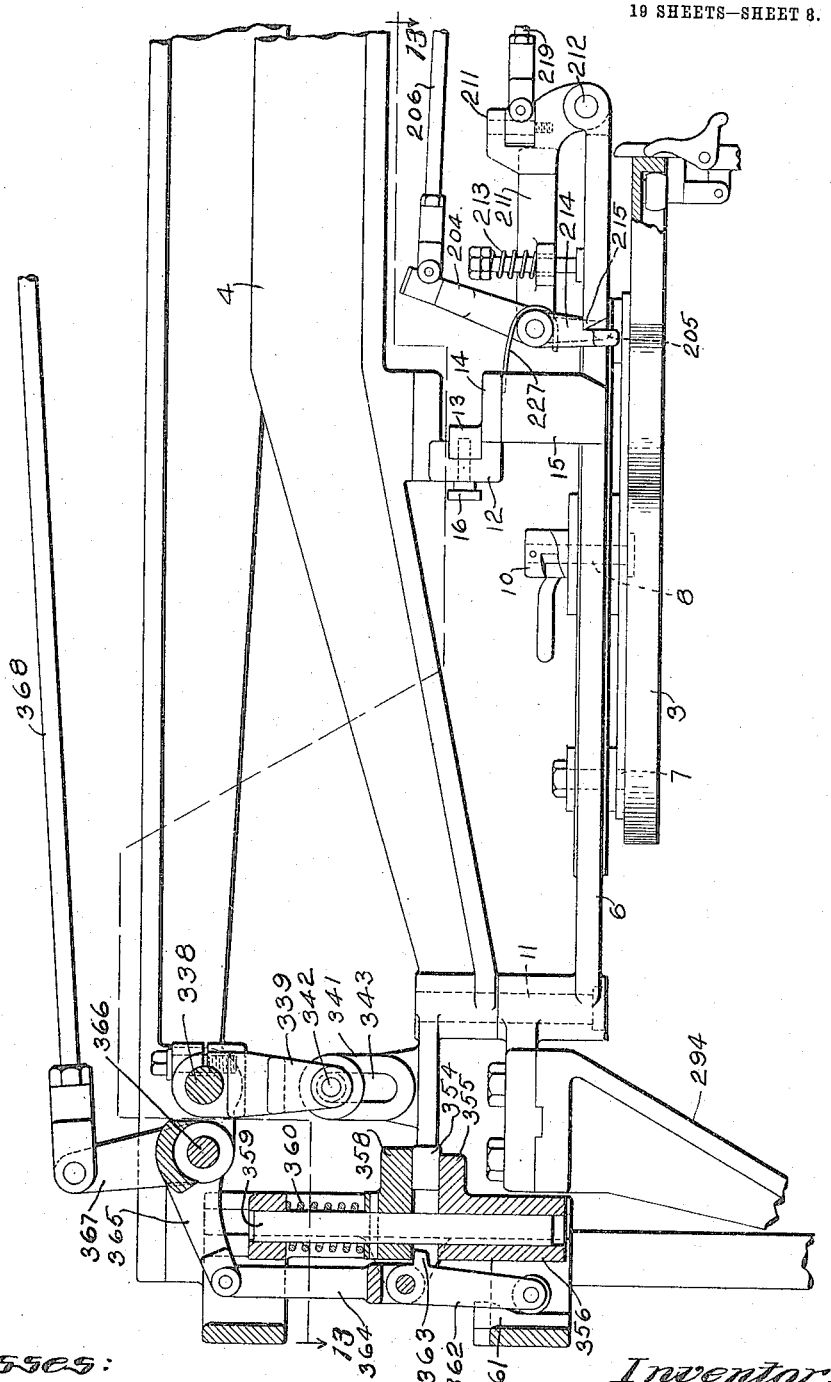

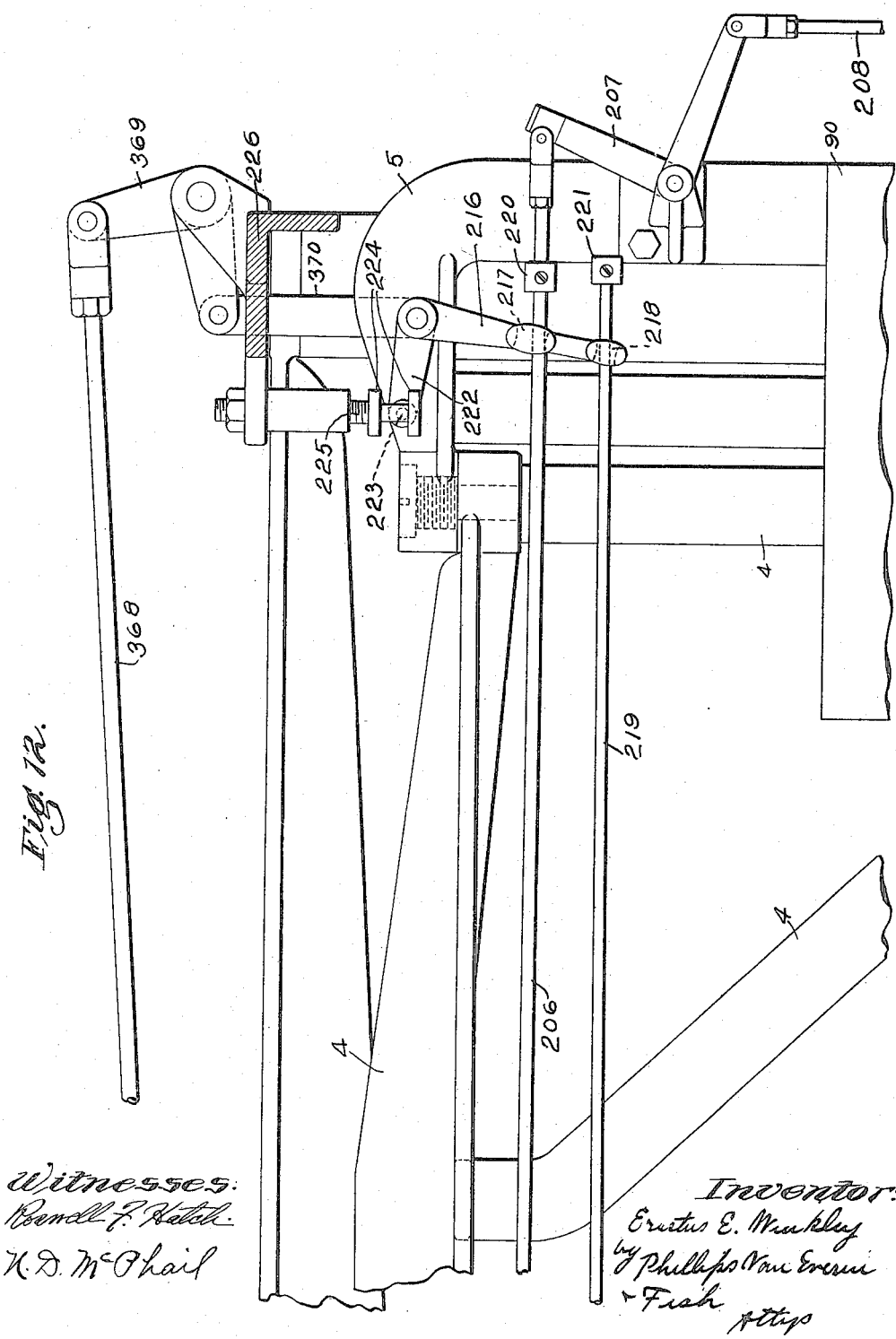

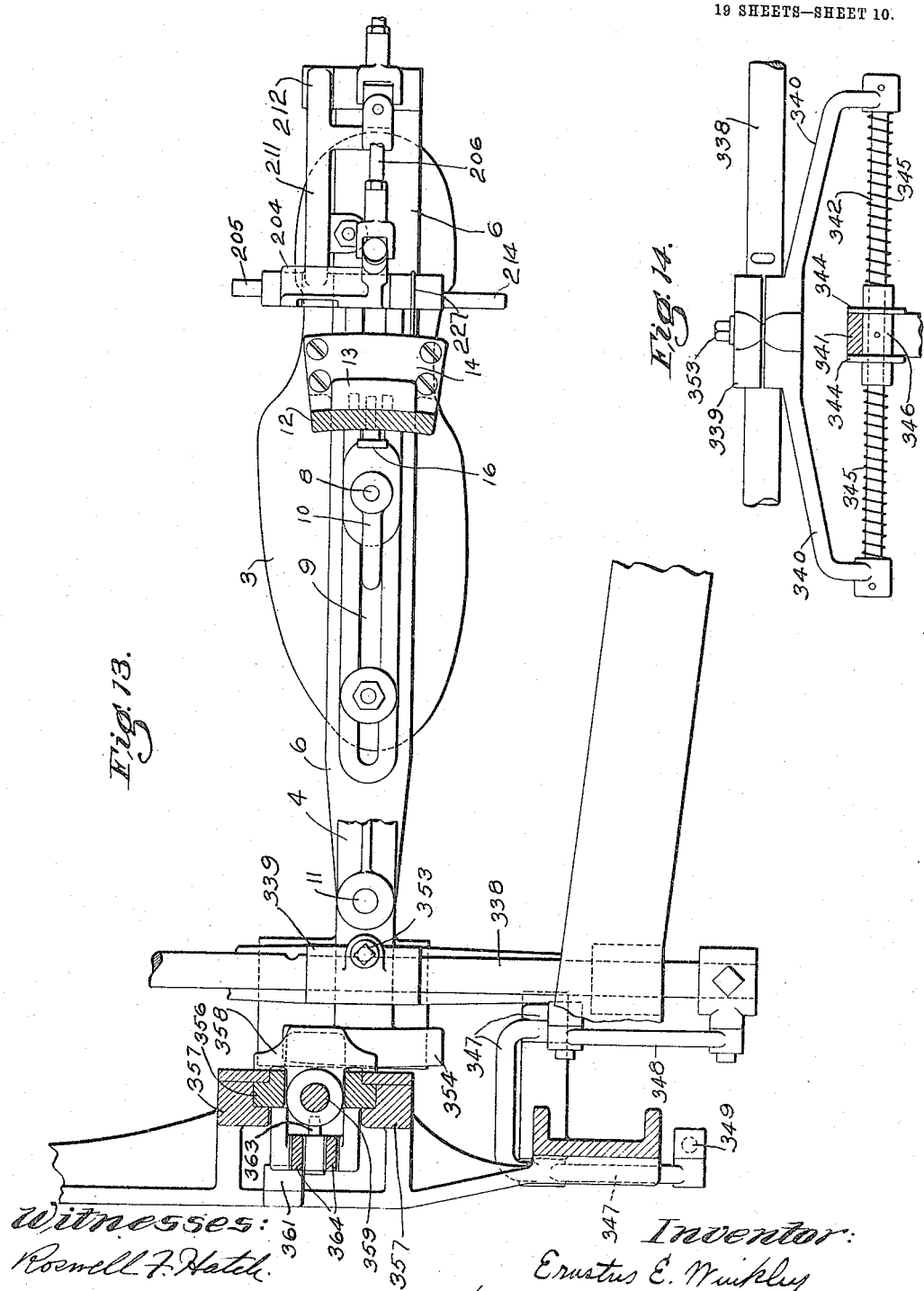

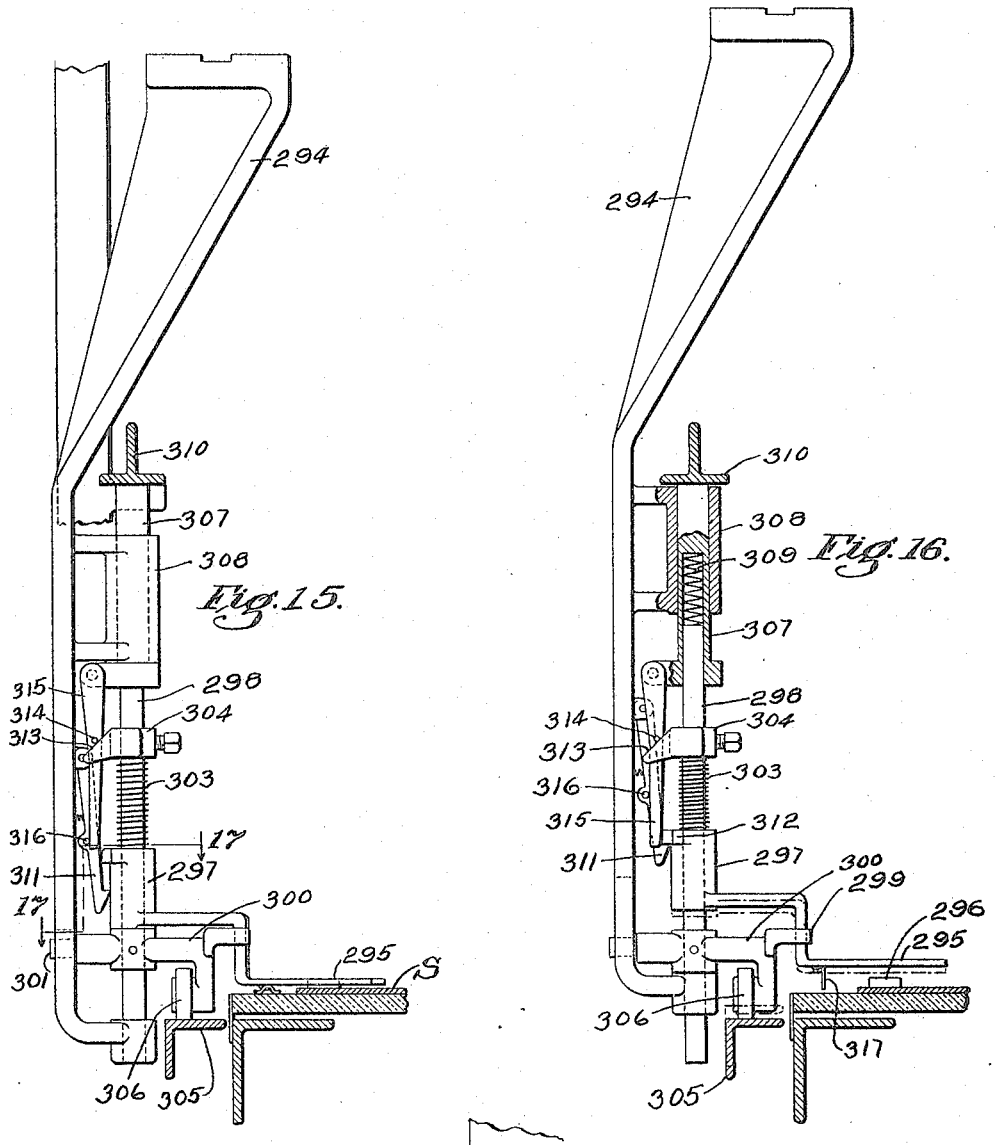

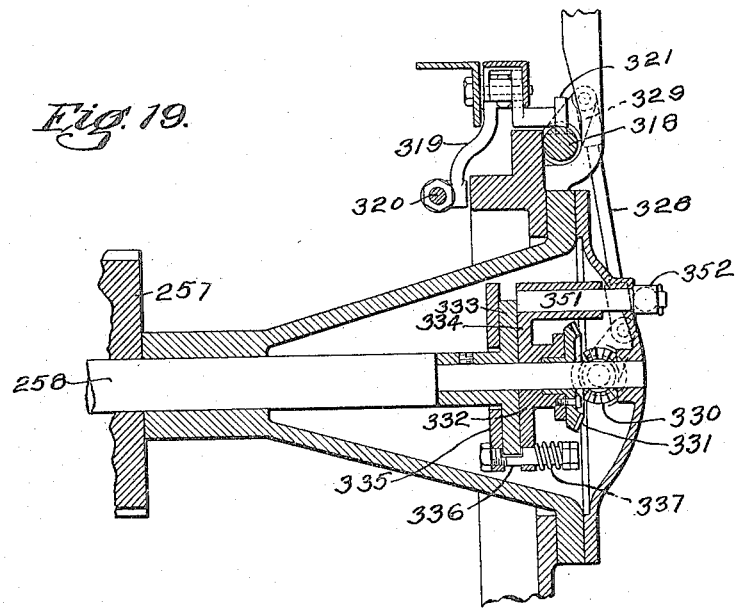
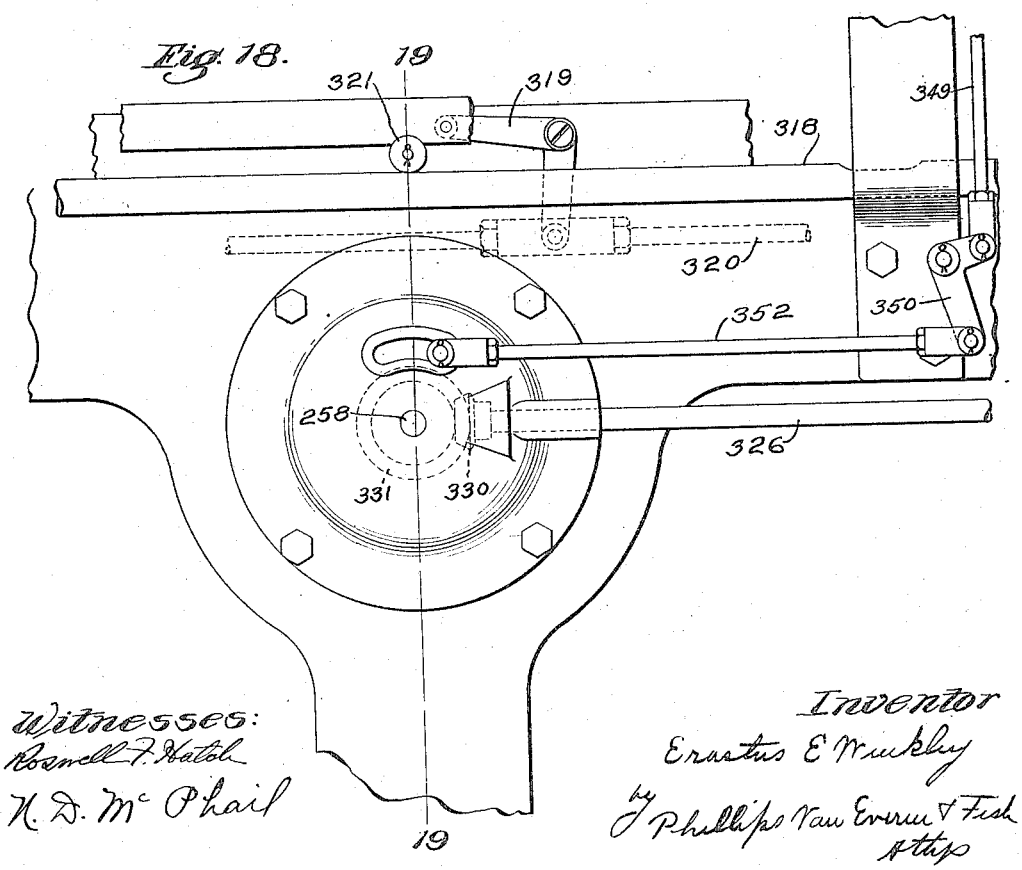

1,136,193.

Patented Apr. 20, 1915.
19 SHEETS—SHEET 13.

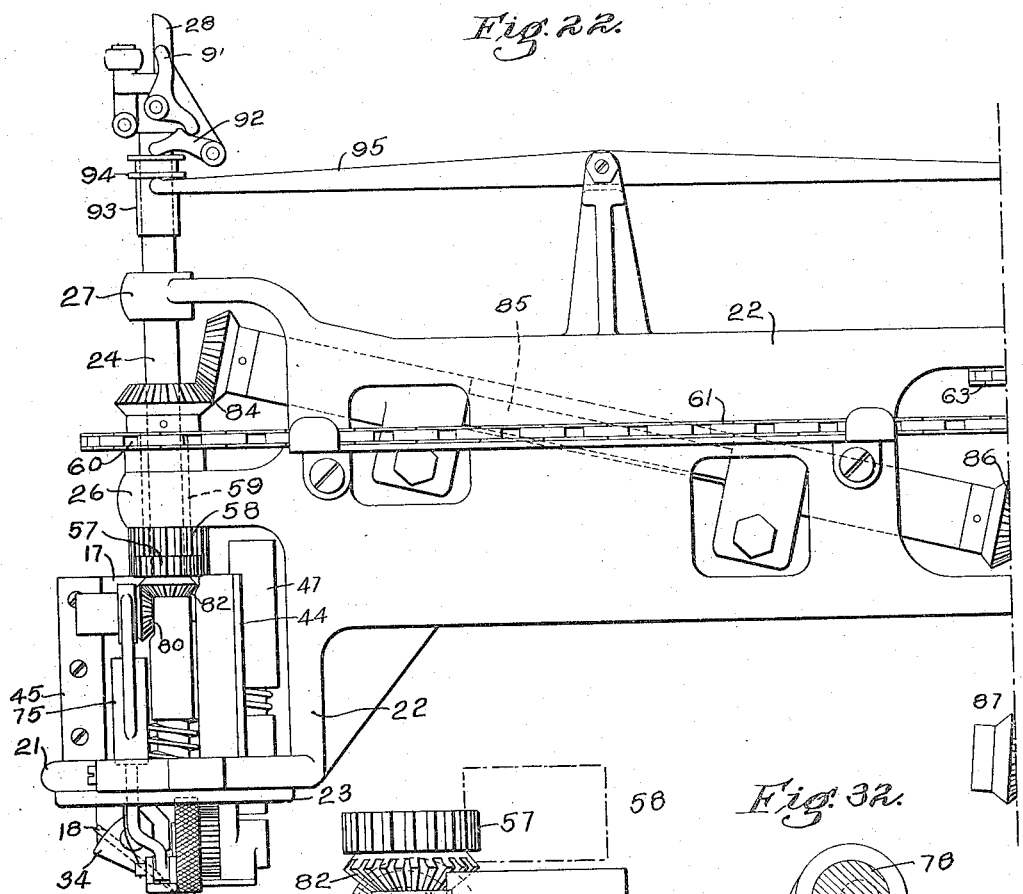
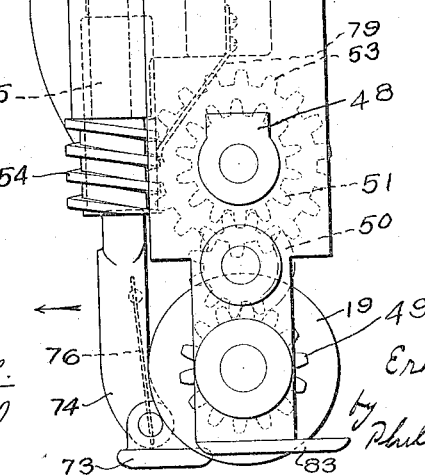
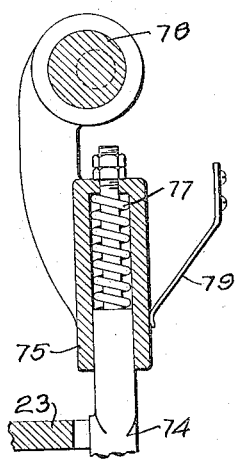

E. E. WINKLEY.
CUTTING MACHINE.
APPLICATION FILED JUNE 30, 1910.

1,136,193.

Patented Apr. 20, 1915.
19 SHEETS—SHEET 16.

Fig. 24.

Witnesses:
Roswell F. Hatch
N. D. McPhail

Inventor:
Erastus E. Winkley
by Phillips Van Everen & Fish
attys

E. E. WINKLEY.
CUTTING MACHINE.
APPLICATION FILED JUNE 30, 1910.

1,136,193.

Patented Apr. 20, 1915.
19 SHEETS—SHEET 17.

Witnesses:
Roswell F. Hatch
N. D. McPhail

Inventor:
Erastus E. Winkley
by Phillips Van Everen & Fish
Attys

E. E. WINKLEY.
CUTTING MACHINE.
APPLICATION FILED JUNE 30, 1910.

1,136,193.

Patented Apr. 20, 1915.
19 SHEETS—SHEET 18.

Witnesses:
Roswell F. Hatch.
H. D. McPhail

Inventor:
Erastus E. Winkley
by Phillips Van Everen & Fish
Attys

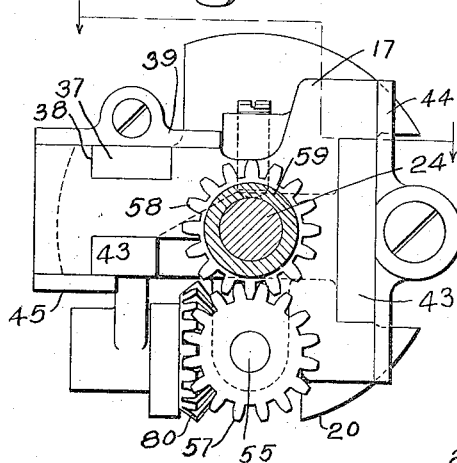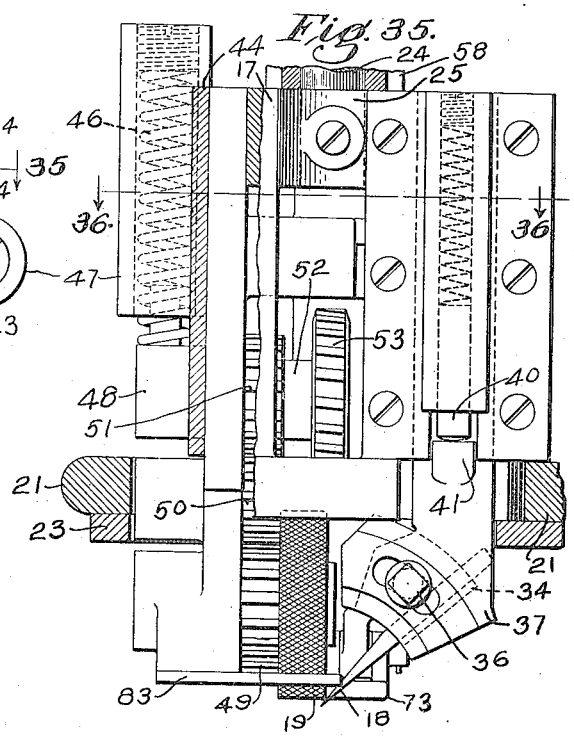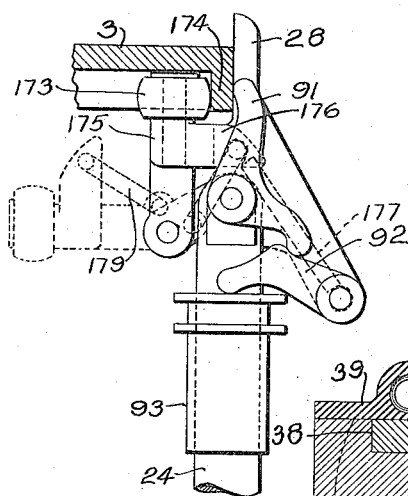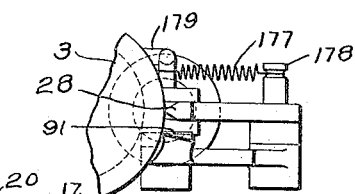

UNITED STATES PATENT OFFICE.

ERASTUS E. WINKLEY, OF LYNN, MASSACHUSETTS.

CUTTING-MACHINE.

1,136,193.  Specification of Letters Patent.  Patented Apr. 20, 1915.

Application filed June 30, 1910. Serial No. 569,640.

*To all whom it may concern:*

Be it known that I, ERASTUS E. WINKLEY, a citizen of the United States, residing at Lynn, in the county of Essex and State of Massachusetts, have invented certain new and useful Improvements in Cutting-Machines; and I do hereby declare the following to be a full, clear, and exact description of the invention, such as will enable others skilled in the art to which it appertains to make and use the same.

The invention relates to machines for cutting articles from sheet material, and more particularly to machines which are adapted to cut shoe soles from sheets of rubber compound.

The object of the invention is to provide a machine of this character having a novel and improved construction and mode of operation whereby rubber shoe soles or other articles may be rapidly and accurately cut from rubber or other sheet material without requiring the services of a skilled operator, and without danger of injuring or destroying the articles.

To these ends the invention consists in the features of construction and combinations of parts hereinafter described and claimed, the advantages of which will be obvious to those skilled in the art.

The various features of the invention will be readily understood from an inspection of the accompanying drawings and the following detailed description of the machine illustrated therein.

Figure 1:
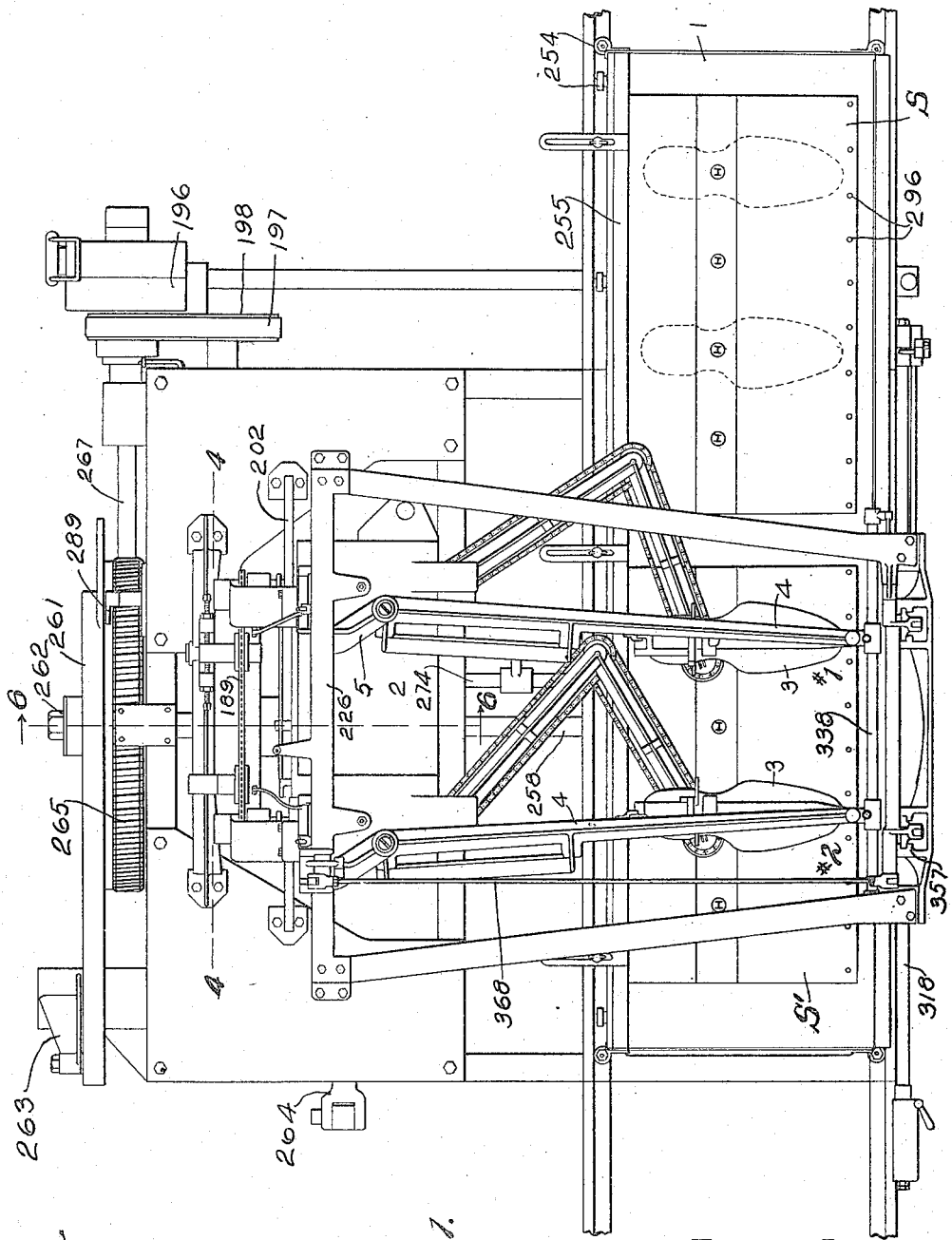
Figure 2:
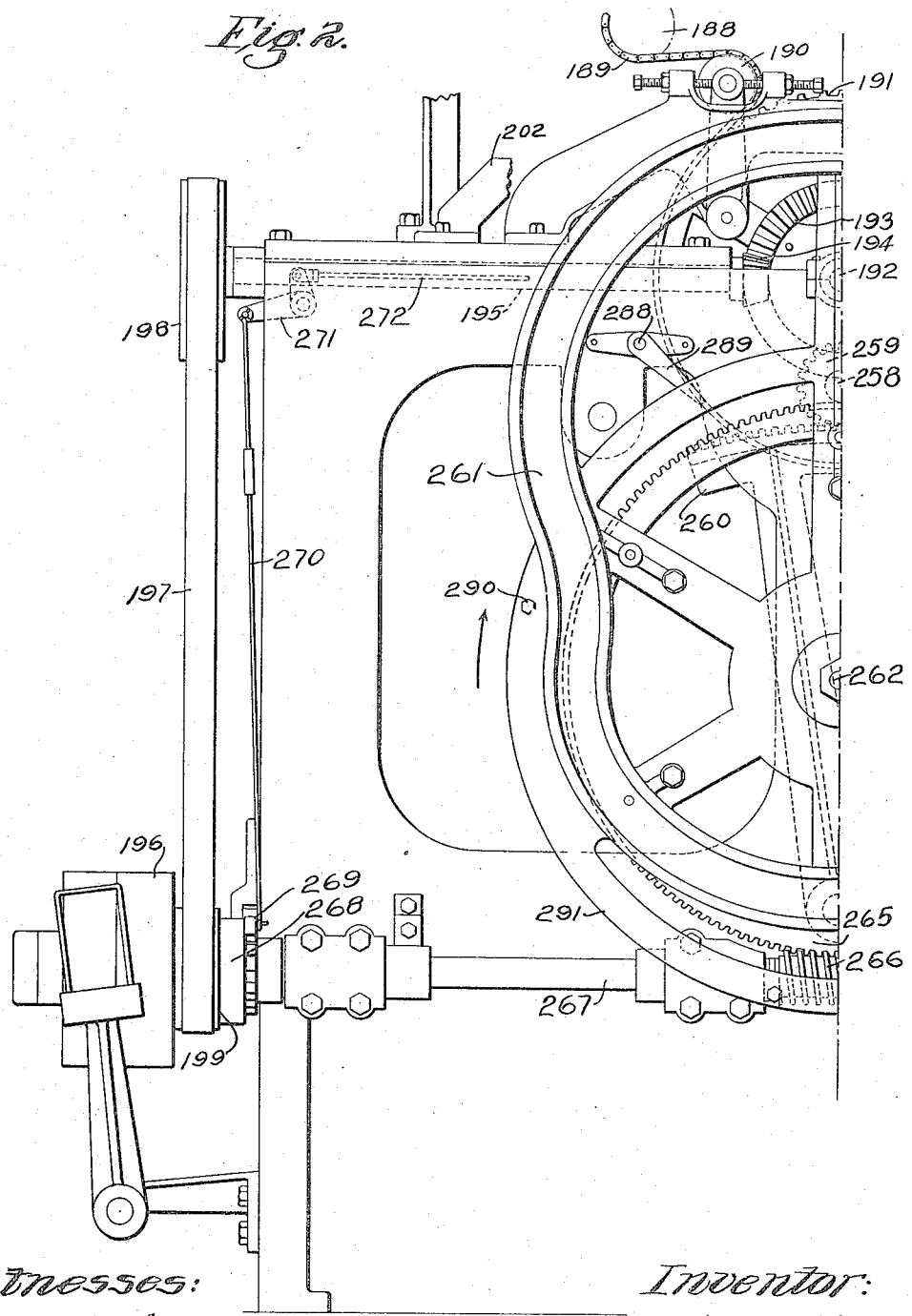
Figure 3:
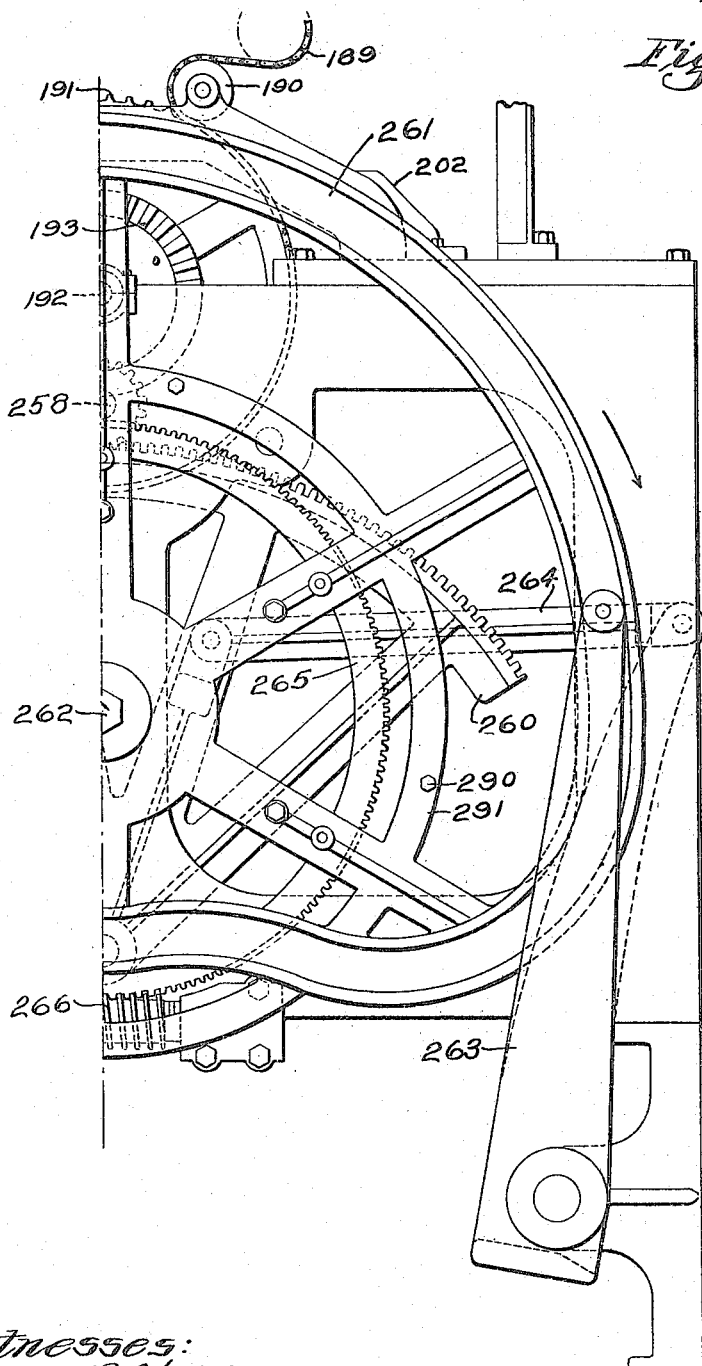
Figure 4:
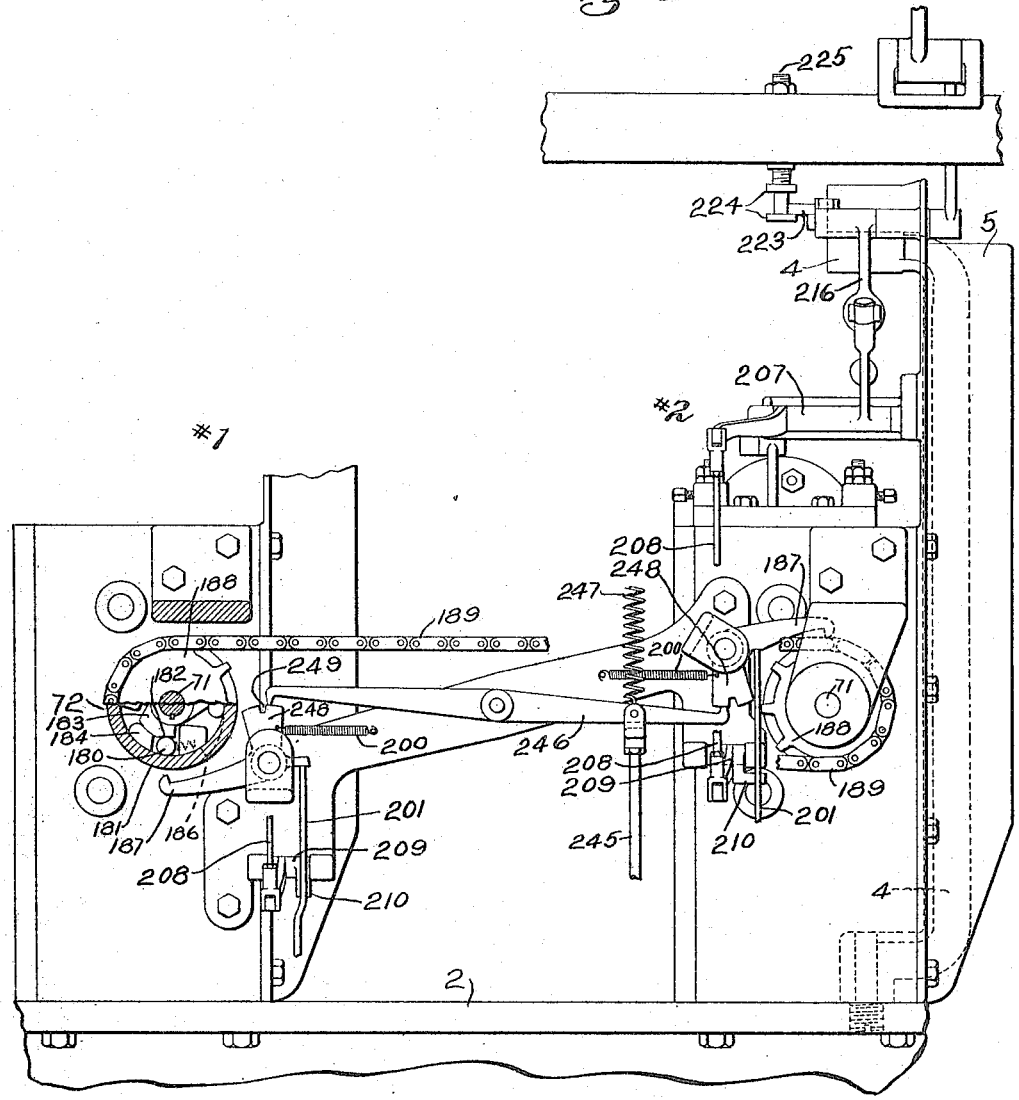
Figure 20:
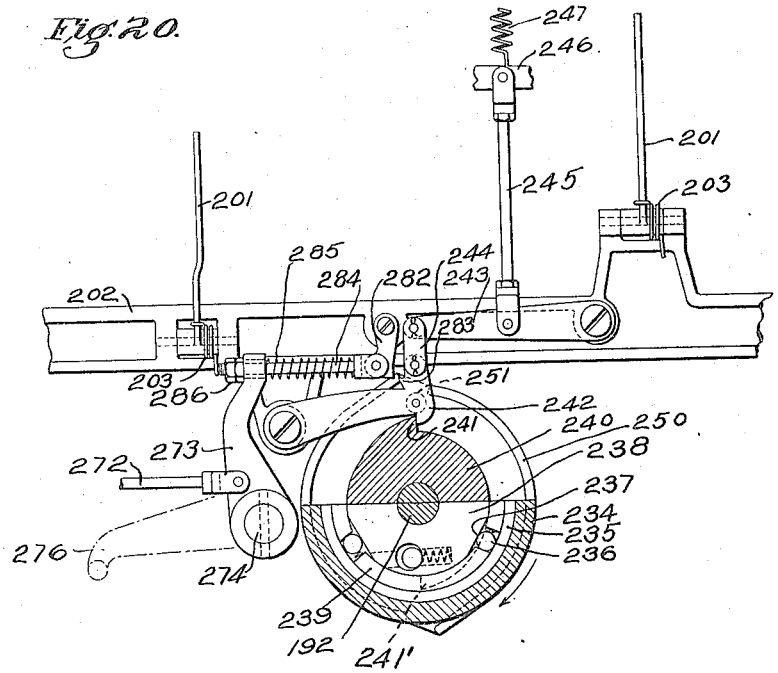
Figure 21:
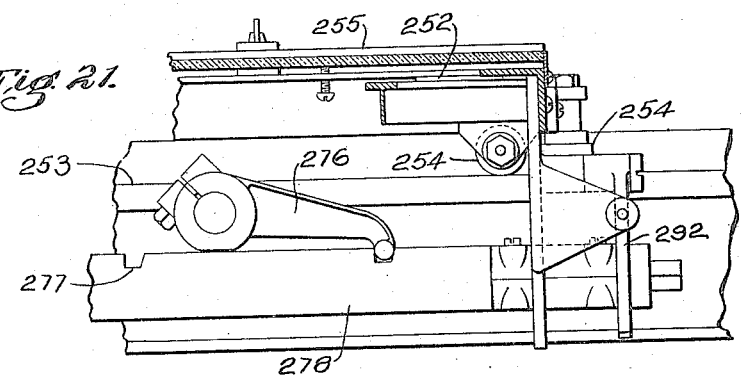
Figure 23:
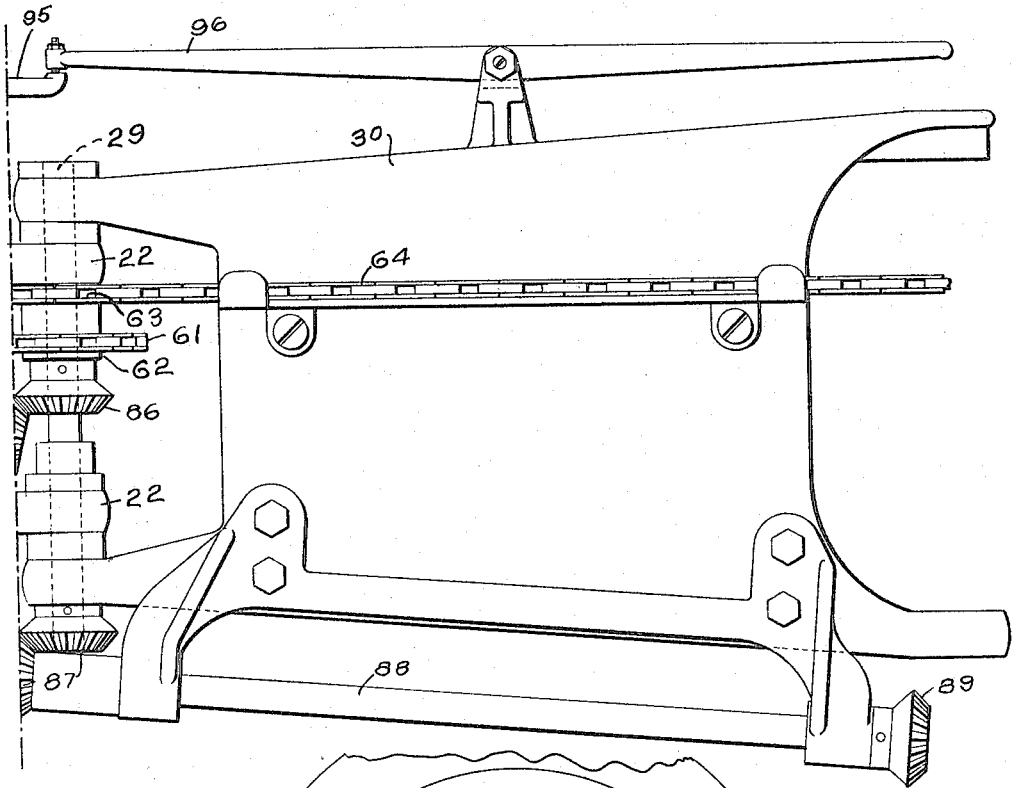
Figure 33:
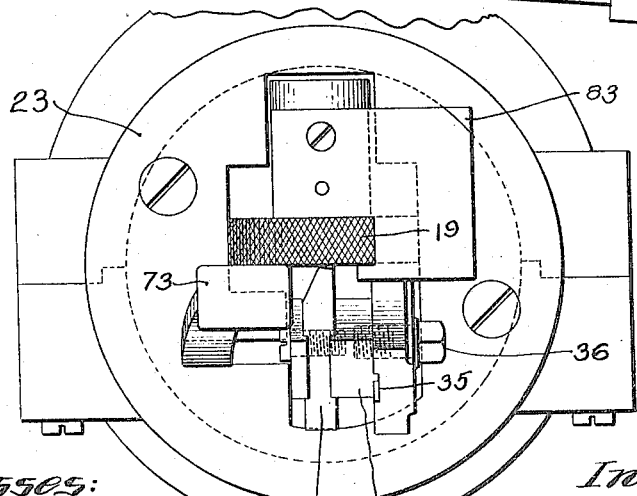
Figure 25:
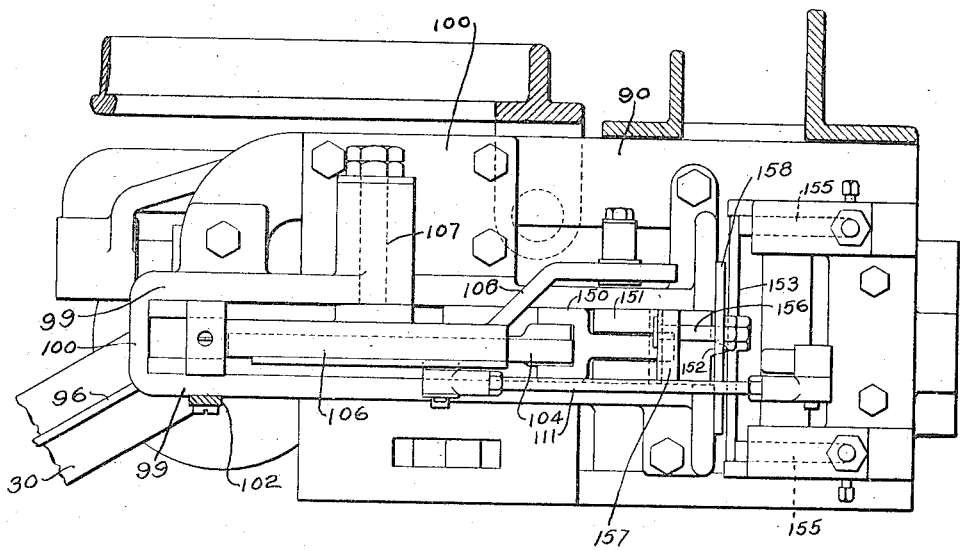
Figure 26:
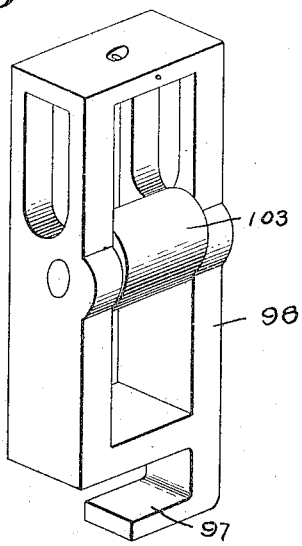
Figure 27:
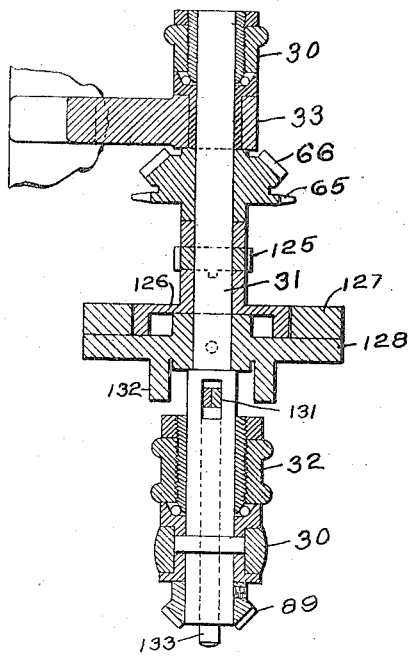
Figures 28, 29:
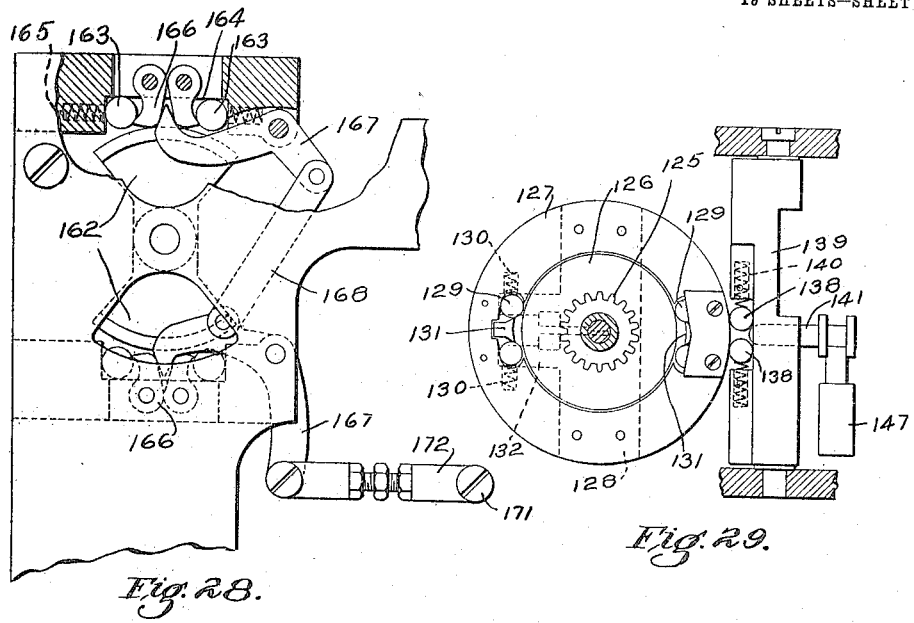
Figure 30:
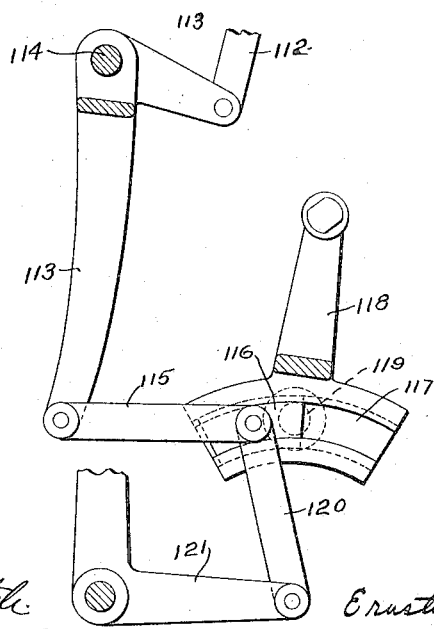

In the drawings, Figure 1 is a plan view of a machine for cutting rubber shoe soles embodying all the various features of the invention in their preferred forms, various parts of the mechanisms embodied in the machine having been omitted for the sake of clearness; Figs. 2 and 3 are a rear elevation of the lower part of the machine; Fig. 4 is a partial rear elevation showing certain parts which are located in front of the plane passing through the line 4—4, Fig. 1, and which extend above the parts shown in Figs. 2 and 3; Fig. 5 is a partial elevation showing certain parts which are located below the parts shown in Fig. 4, and in front of the plane passing through the line 4—4 above referred to; Fig. 6 is a vertical sectional view on line 6—6, Fig. 1, looking toward the right, the table shifting cam and worm wheel connected thereto being omitted; Fig. 7 is a partial end elevation looking toward the left in Fig. 1, and showing the end of the work supporting table and the front ends of the shafts, which are broken away at the right of Fig. 6; Fig. 8 is a detail view of a controller bar forming part of the mechanism which corrects the position of the cutting mechanism; Fig. 9 is a section of this bar on line 9—9, Fig. 8; Fig. 10 is a view showing the opposite ends of a bar carried by the work supporting table which controls the arrest of the table shifting mechanism; Figs. 11 and 12 are elevations showing the front and rear ends respectively of the pattern supporting arms; Fig. 13 is a sectional plan view on line 13—13, Fig. 11; Fig. 14 is a detail front elevation of parts shown in Fig. 13; Fig. 15 and 16 are elevations showing the parts of the mechanism for correcting the positions of the cutting mechanisms; Fig. 17 is a detail plan view of parts shown in Figs. 15 and 16; Fig. 18 is a partial front elevation showing parts of the correcting mechanism; Fig. 19 is a sectional view on line 19—19, Fig. 18; Fig. 20 is a sectional detail on line 20—20, Fig. 6; Fig. 21 is a detail sectional elevation on line 21—21, Fig. 7; Figs. 22 and 23 show a side elevation of the supporting arms for the cutter heads; Fig. 24 is a detail elevation showing the operating and controlling mechanism for one of the cutter heads, one side of the casing inclosing the mechanism being removed; Fig. 25 is a sectional plan view of the parts shown in Fig. 24; Fig. 26 is a perspective view showing in detail one of the parts illustrated in Figs. 24 and 25; Fig. 27 is a sectional detail on line 27—27, Fig. 24; Fig. 28 is a detail elevation showing parts carried by the plate which is removed from the casing in Fig. 24, and which coöperate with parts shown in Fig. 24; Fig. 29 is a detail plan view of parts illustrated in Fig. 24; Fig. 30 is a detail elevation of parts illustrated in Fig. 24; Fig. 31 is a detail view showing the feed wheel carrying slide which is mounted in the cutter head; Fig. 32 is a detail of the presser foot carried by the cutter head; Fig. 33 is a bottom view of the cutter carrying head; Fig. 34 is a plan view of the cutter carrying head removed from its supporting bearings; Fig. 35 is a sectional elevation on line 35—35, Fig. 34, looking in the direction of the arrows; Fig. 36 is a sectional view on line 36—36, Fig. 35, looking in the direction of the arrows; Fig. 37 is a detail elevation of the upper end of the cutter head, showing a part of the pattern in section; and Fig. 38 is a plan view of the parts shown in Fig. 37.

The machine illustrated in the drawings is especially adapted to cut shoe soles from sheets of rubber compound upon which the usual medallions which are to appear in the middle of each sole have been impressed. This machine comprises two cutting mechanisms which operate to simultaneously cut two shoe soles from a sheet of rubber stock carried upon a work supporting table. Each cutting mechanism comprises a pattern, the outline of which corresponds to the outline of the sole to be cut, a cutter carrying head and feeding and controlling mechanism which causes the cutter to travel along the material to be cut in a path corresponding to the outline of the pattern. Each cutter is operated and controlled independently of the other, and as each cutter finishes cutting a sole, its operating and controlling mechanism is thrown out of operation. When both cutters have finished their cutting operation, the cutter carrying heads are raised to disengage the cutters from the stock, and mechanism for shifting the work supporting table to present a new portion or part of the stock to the cutters is thrown into action. As the shifting movement of the table is completed, the cutter carrying heads are lowered to engage the cutters with the stock on the table, and the operating and controlling mechanism for each cutter head is again thrown into action.

As the shifting of the work supporting table is completed, and before the cutter carrying heads are lowered, the positions of the cutting mechanisms with relation to the stock are corrected by mechanism controlled by projections on the sheet of stock, so that the soles are cut at the proper points on the sheets, notwithstanding any inaccuracies in the positions of the medallions, due to the unequal stretching or distortion of the sheets, or to inaccurate placing of the sheets on the work supporting table. The table is adapted to support two sheets of rubber compound, and is so shifted that the operator may remove a cut sheet and the soles cut therefrom from one end of the table, and place a fresh sheet of stock thereon, while the cutting mechanisms are operating to cut soles from a sheet of stock on the other end of the table.

In the machine shown in the drawings, the sheets of rubber stock S S' from which the shoe soles are to be cut, are carried upon a work supporting table 1, and are presented to the action of two cutting mechanisms which are indicated generally in Fig. 1 at No. 1 and No. 2. The two cutting mechanisms are alike in construction, and each mechanism comprises a cutter carrying head supported for free bodily movement over the work supporting table, and mechanism for feeding the head and causing it to travel in a path corresponding to the outline of a pattern which is supported above the work supporting table. Both cutting mechanisms are carried by a vertically movable support 2 (Figs. 1, 4 and 5), which is raised at proper intervals to disengage the cutters from the stock, and is lowered to reëngage the cutters, by mechanism which will be described later on.

The pattern 3 of each cutting mechanism is supported upon an arm 4, the rear end of which is pivotally connected to the support 2. The rear end of the arm 4 is in the form of a yoke, the upper arm of which is pivotally connected to the upper end of a bracket 5, and the lower arm of which is pivoted to the base plate of the support 2 (Figs. 4, 12, 24 and 25). The pattern 3 is removably secured to the under side of a plate 6 which is in turn adjustably secured to the forward end of the arm 4 (Figs. 11 and 13). The means for securing the pattern to the plate 6 consists of a pin 7 and clamping bolt 8 which are adjustably secured in a slot 9 in the plate, and are adapted to engage coöperating recesses in the pattern. The clamping bolt is provided with a cam lever 10 by manipulation of which the pattern may be quickly and conveniently attached or detached when it is desired to make a change in the style or size of the sole to be cut. The front end of the plate 6 is pivotally connected with the arm 4 by a stud 11, and the rear end of the plate is supported by a bracket 12 which is grooved to receive a rib 13 formed on a plate 14 secured to standards 15 which rise from the plate 6. By swinging the plate 6 about the pivot 11, the pattern 3 may be adjusted into position to extend at the proper angle transversely of the work supporting table. The plate is secured firmly in adjusted position upon the arm 4 by a pin 16 adapted to engage any one of a series of holes formed in the rib 13.

Each of the cutter carrying heads comprises a supporting block or head proper 17 which carries a cutter knife 18 and a feed wheel 19 for engaging the stock and causing a travel of the head and cutter in a path corresponding to the outline of the pattern (Figs. 22 and 31 to 38). The lower end of the block 17 is provided with segmental bearing surfaces 20 which are embraced by a bearing 21 formed at the front end of a supporting arm 22. A plate 23 is secured to the bottom of the block 17, and engages the under surface of the bearing 21 and prevents upward movement of the cutter carrying head in the bearing. The cutter carrying head is also provided with an upwardly extending spindle or shaft 24, the lower end of which is secured in a socket 25 in the upper end of the block 17. The shaft 24 extends up through bearings 26 and 27 on the arm 22, and is provided at its upper end with a gage finger 28 adapted to engage the periphery of the pattern 3. The pattern engaging face of the gage finger 28 is located in the axis of the cutter head. In order that the cutter head may be free to move bodily in any direction over the work supporting table, the head supporting arm 22 is pivotally supported at its rear end upon a shaft 29 which is mounted in bearings in the front end of a second arm 30 (Figs. 22, 23 and 24). The rear end of the arm 30 is in turn pivotally supported to turn about a shaft 31 which is supported in bearings 32 and 33 formed on the support 2 for the cutting mechanisms.
The cutting knife 18 is arranged at an angle to the surface of the work supporting table, so that a beveled edge is cut upon the shoe sole. The knife is mounted in a knife block 34 which is secured in a segmental guideway 35 by a clamping bolt 36, so that the knife may be adjusted about its point of operation to vary its angle. The segmental guideway for the knife block is formed in the lower end of a knife carrying slide 37, which is held in a vertical guideway 38 in the block 17 by a retaining plate 39. The point of the knife is held in continuous engagement with the surface of the work supporting table during the cutting by a spring pressed plunger 40 mounted in the retaining plate 39, and arranged to engage a lug 41 on the knife carrying slide. The knife carrying slide is supported when the cutter head is raised by the engagement of the lug 41 with the plate 23.

The feed wheel 19 is mounted in a carrier slide 42 provided with flanges 43 engaging vertical guideways in the head 17 and retained therein by the retaining plates 44 and 45. The wheel carrying slide is forced continually against the stock during the cutting, by a spring 46 retained in a boss 47 on the retaining plate 44, and engaging a lug 48 on the slide. The slide is supported when the cutter head is raised by the engagement of the lower end of the ways 43 with the plate 23. The feed wheel is rotated to feed the cutter head along the stock through the pinion 49 secured to one side of the wheel and engaged by a pinion 50 which in turn engages a pinion 51. The pinion 51 is formed on one end of a sleeve 52 (Fig. 35), the other end of which carries a worm wheel 53. The worm wheel 53 is engaged by a worm 54 formed on the lower end of a shaft 55 which is mounted in a bearing 56 in the slide 42. A pinion 57 is secured to the upper end of the shaft 55, and engages an elongated pinion 58 mounted on the shaft 24. The pinion 57 is carried by the lower end of a sleeve 59 mounted within the bearing 26 on the arm 22, and the upper end of the sleeve carries a sprocket wheel 60. The sprocket wheel is driven through a chain 61 passing over the wheel, and over a similar sprocket wheel 62 mounted on the shaft 29. The sprocket wheel 62 is connected with a second sprocket wheel 63 which is driven through a chain 64 passing over the wheel and over a similar sprocket wheel 65 mounted on the shaft 31. The sprocket wheel 65 is formed on the hub of a bevel gear 66 which is engaged by a similar gear 67 secured to one end of a shaft 68. The other end of the shaft 68 is connected by gears 69 and 70 with a shaft 71 which is continually driven through a driving clutch 72 during the cutting operation. Through the gearing and connections described, the feed wheel is continuously rotated to cause the cutter head and cutter to travel along the stock supported on the work supporting table.

The rubber stock which is operated upon by the feed wheel and cutter is in a comparatively soft and plastic state, and as the feed wheel draws the cutter through the stock the stock is liable to lift away from the surface of the work supporting table, or to bunch up in front of the cutting edge of the knife. To avoid this, and insure an accurate and uniform cutting action upon the stock, means is provided for holding down or compressing the stock immediately in advance of the cutting edge of the knife. In its preferred form this means comprises a presser foot 73 carried by the wheel carrying slide 42 and forced intermittently against the surface of the stock in advance of the cutting edge of the knife as the knife travels through the stock. This presser foot is in the form of a shoe pivoted to the lower end of a bar 74 which is yieldingly mounted in a carrier arm 75. The presser foot is held yieldingly in position with its lower surface substantially parallel to the surface of the stock by a light spring 76, the free end of which extends through the pivot pin which carries the presser foot. The presser foot may therefore automatically adjust itself to the surface of the stock, and when freed from the stock, returns to normal position. Tte bar 74 is held in normal position in the carrier arm 75 by a spring 77 (Fig. 32), so that the presser foot may apply a yielding pressure to the stock. The presser foot is intermittently raised and lowered by an eccentric 78 which engages a bearing formed in the upper end of the carrier 75. The bar 74 is held normally against the end of a slot in the plate 23 by a leaf spring 79. The eccentric 78 is formed on the hub of a bevel gear 80 which is mounted on a stud 81 carried by the slide 42, and is engaged by a bevel gear 82 secured on the shaft 55. As the feed wheel feeds the cutter head forward, the presser foot is raised and lowered by the eccentric 78. When the presser foot is forced against the stock its forward travel ceases, and the spring 79 yields as the cutter head and cutter continue to move forward. When the presser foot is raised, the spring 79 returns it to position with the bar 74 against the end of the slot in the plate 23, preparatory to the next engagement of the presser foot with the stock. The presser foot thus acts to intermittently compress and hold the stock against upward movement or distortion immediately in front of the cutter during the travel of the cutter through the stock. The cutter head is also provided with a stripper plate 83 arranged directly back of the point of engagement of the feed wheel with the stock, to prevent the stock from rising with the feed wheel as the surface of the wheel leaves the stock.

In order that the path of the travel of the cutter may correspond to the outline of the pattern 3, the angular position of the cutter head should be so varied that the feed wheel will cause the gage finger 28 to travel along the periphery of the pattern. Mechanism is therefore provided for turning the cutter head in its bearings in accordance with the curvature of the form at the point corresponding to the point of operation of the cutter and feed wheel. Turning movements are imparted to the cutter head to determine the path of travel of the cutter and feed wheel through bevel gears 84 connecting the shaft 24 of the cutter head with a shaft 85 mounted on the arm 22. The shaft 85 is connected through bevel gears 86 with the shaft 29 which is mounted in the end of the arm 30. The shaft 29 is connected through bevel gears 87 with a shaft 88 mounted upon the arm 30, and connected through bevel gears 89 with the shaft 31 which is mounted in the vertically movable support 2 for the cutter mechanism. Through this mechanism, movements imparted to the shaft 31 are transmitted to the cutter head to control the path of movement of the head.

The movements imparted to the shaft 31 are determined by controlling mechanism mounted within a casing 90 on the support 2, and controlled by a feeler 91 mounted upon the upper end of the cutter head shaft and arranged to engage the periphery of the pattern in advance of the gage finger 28 (Figs. 22, 23, 24, 37 and 38). The feeler 91 is in the form of a lever pivoted to the upper end of the cutter head shaft, the upper end of the lever being arranged to engage the pattern, and the lower end of the lever being arranged to engage a lever 92 which is also pivoted to the upper end of the cutter head shaft. The free end of the lever 92 engages the upper end of a sleeve 93 which is mounted to slide and turn freely upon the cutter head shaft 24. The sleeve 93 is provided with a flange 94 which engages the front end of a lever 95 pivoted upon the arm 22. The rear end of the lever 95 engages the front end of a lever 96 which is pivoted on the arm 30. The rear end of the lever 96 engages a ledge 97 formed on the lower end of a roll carrying slide 98. The roll carrying slide 98 is mounted to slide freely between the side plates 99 of a bracket 100 which is secured to the upper part of the casing 90. The slide 98 is supported and moved upward by a long light spring 101, the lower end of which is connected to the upper end of the slide, and the upper end of which is secured to the laterally projecting upper end of a bar 102 which is secured to one of the side plates 99. The roll carrying slide 98 carries a roll 103, the vertical position of which is controlled by the feeler 91 through the connections between the feeler and the roll carrying slide. The position of the roll 103 determines the extent and direction of the rotary movements imparted to the shaft 31 and cutter head through the following mechanism. Coöperating with the roll 103 is a reciprocating controller slide 104 provided at its forward end with two oppositely inclined surfaces 105 adapted to pass on opposite sides of the roll 103 when the roll is in mid-position. The slide 104 is mounted in a carrier lever 106 which is pivoted at 107 and is provided with a rearwardly extending arm 108. The slide 104 is continuously reciprocated during the cutting operation by a cam 109 secured to the shaft 68, and operating upon a lever 110 which is connected by a link 111 to the slide. The arm 108 of the carrier lever 106 is connected by a link 112 with one arm of a bell crank lever 113 secured to a rock shaft 114. The other arm of the bell crank lever 113 is connected by a link 115 with a block 116 which is mounted to slide in a segmental slot 117 formed in the actuator lever 118. The actuator lever is pivoted upon a shaft 119 and the segmental slot 117 extends on opposite sides of the pivot shaft (Fig. 30). The block 116 is connected by a link 120 with one arm of a bell crank lever 121, the other arm of which is connected by a link 122 with a sleeve 123 mounted to slide on the shaft 71. The sleeve 123 is provided with a rack 124 engaging a pinion 125 which is mounted to turn loosely on the shaft 31 (Figs. 24 and 27). The pinion 125 is coupled with the driving member 126 of a double-acting Horton clutch, the driven member 127 of which is secured to a plate 128, which is in turn secured to the shaft 31. The driven member 127 of the clutch carries the clamping rolls 129 (Fig. 29), which are forced in a direction to connect the driving and driven members of the clutch by springs 130, and are pressed back into inactive position by the upper ends of the bell crank levers 131 which are pivoted between arms 132 depending from the plate 128. The lower ends of the bell crank levers 131 extend into a slot formed in the shaft 31, and are engaged by a vertically sliding pin 133 arranged within the shaft. The bell crank levers are operated to render the clutching rolls 129 active or inactive by a cam 134 secured to the shaft 71, and operating a lever 135 which is connected by a link 136 with one arm of a bell crank lever 137, the other arm of which engages the lower end of the pin 133.

During the movement of the actuator lever 118 in one direction the clutching rolls 129 are held away from the driven member, and during the movement of the actuating lever in the opposite direction, the rolls are freed and connect the driving and driven members of the clutch, so that the driven member of the clutch will move with the driving member. During the return or idle stroke of the actuator lever and driving member of the clutch, the driven member is held against movement in either direction by two clamping rolls 138 which are forced into clamping position between the periphery of the driven member and the surface of the bar 139 by springs 140. These clamping rolls are rendered inactive during the active stroke of the actuator lever by a pin 141 operated by a cam 142 which is secured to a cam shaft 143. The cam shaft is driven from the shaft 71 through gears 144 and 70. The cam 142 operates a lever 145 which is connected by a link 146 with a lever 147, the upper end of which is connected with the pin 141. The actuating lever 118 is continually oscillated during the cutting operation by a cam 148 secured to the shaft 71 and engaging a roll on the upper end of the lever.

So long as the feeler finger 91 and the gage finger 28 are in line with each other in the direction of the travel of the cutter head, the roll slide 98 will be held with the roll 103 in normal or mid-position. When the roll is in this position the inclined surfaces 105 on the controller slide 104 will pass on opposite sides of the roll without effecting any swinging movement of the carrier lever 106. The connections between the carrier lever and the block 116 are such that under these conditions the pivotal connection between the upper end of the link 120 and the block will be in line with the axis of the actuating lever 118. No turning movement will therefore be imparted to the shaft 31 or to the cutter head so long as the feeler and gage finger are in line. Whenever the feeler finger is swung out of line with the gage finger 28 by reason of the curvature of the pattern, the roll 103 will be raised or lowered as the case may be, and the distance through which it is moved from its mid-position will be proportional to the curvature of the form between the point of engagement of the finger 28 and the point of engagement of the feeler. Now when the slide 104 advances, one of the surfaces 105 will ride against the roll and swing the carrier lever 106 about its pivot. This movement of the carrier lever will, through the connections described, shift the block 116 to one side or the other of the axis of the actuating lever 118, so that during the active stroke of the lever the driving member 126 of the clutch will be operated to turn the shaft 31 and the cutter head through a distance depending upon the curvature of the pattern corresponding to the point of operation of the cutter and feed wheel.

During the advance movement of the controller slide 104 the roll carrying slide 98 is firmly clamped against movement in either direction by a clamping bar 149 which is actuated through devices connecting it with the upper end of the lever 135 above referred to. These devices consist of toggle links 150 one of which is connected with the clamping bar, and the other of which is connected to a sliding block 151 (Figs. 24 and 25). The block 151 is provided on its rear end with a lug 152 which bears upon a heavy spring plate 153 which determines the clamping pressure applied to the roll slide. The spring plate may be adjusted to vary the clamping pressure by means of adjusting wedges 154 which engage the rear end of the bars 155 which support the plate. The block 151 is held against forward movement by a bolt 156 which passes through an upwardly projecting lug 157 on the block and a retaining plate 158. The toggle links 150 are connected with the lever 135 through a bell crank lever 159, one arm of which is connected by a link 160 with the toggle, and the other arm of which is connected by a link 161 with the lever.

After the block 116 has been positioned by the controller slide, it is firmly held in position during the active stroke of the actuator lever so that the controller slide may be immediately retracted to free the roll carrying slide and feeler finger.

The devices for locking or clamping the block 116 against movement in either direction comprise clamping segments 162 secured to the rock shaft 114, and coöperating clamping rolls 163 (Figs. 24 and 28). The clamping rolls are forced in a direction to wedge them between the periphery of the clamping segments and the opposing surface 164 by springs 165. The rolls are held out of action during the advance stroke of the controller slide 104 by levers 166 actuated by the wedge-shaped ends of two bell crank levers 167 which are connected by a link 168. These levers are actuated by a cam 169 secured to the shaft 143, and operating a lever 170. The upper end of the lever 170 is connected by a pivot screw 171 with one end of a link 172, the other end of which is connected to one of the bell crank levers 167.

By the actuating and controlling mechanism above described the cutter head is caused to travel along the stock in a path corresponding to the outline of the pattern, and the gage finger 28 is maintained in engagement with the periphery of the pattern during the cutting operation. After the cutting operation has been completed and the cutter heads are raised so that the knife and feed wheel are free from the stock, the cutter head might swing away from the pattern, unless means were provided for retaining the gage finger 28 in engagement with the pattern at this time. Such means is therefore provided, and this means in the construction shown consists of a roll 173 which is held yieldingly against the inner side of a marginal flange 174 formed along the periphery of the pattern, the roll being arranged to engage the flange opposite the gage finger 28. As shown, the roll 173 is mounted in the upper end of an arm 175 which is pivotally supported at its lower end upon a lug projecting from the upper end of the cutter head shaft 24. The arm 175 is provided near its upper end with a lateral projection 176 which straddles the finger 28. The roll is held yieldingly in engagement with the flange 174 by a spring 177, one end of which is connected to a fixed pin 178, and the other end of which embraces the horizontal part of a bale 179 connected to the arm 175. When it is desired to remove and replace the pattern, the roll may be swung down into the dotted line position shown in Fig. 37, and at this time the end of the spring 177 may be slid along the bale so that it will engage the lower end of the bale, and not act to return the roll to its active position. The roll 173 not only acts as a means for retaining the gage finger on the cutter head in engagement with the pattern when the cutter head is raised, but also tends to keep the gage in engagement with the pattern during the cutting operation, and adds to the accuracy of the cutting, especially when the machine is operating at a high speed, and along points on the pattern where the curvature changes rapidly.

The actuating and controlling mechanism for each cutter head is driven through an independently controlled clutch 72. These clutches as shown are a form of Horton clutch, the clutching rolls 180 of which are arranged to wedge between the inner periphery of the driving members 181 and clutching surfaces 182 formed on disks 183 which are secured to the shafts 71 of the actuating and controlling mechanism (Fig. 4). The clutch rolls are controlled to throw the clutch into and out of action by lugs 184 connected with a disk 185. This disk is provided with a stop shoulder 186 adapted to be engaged by the hooked end of a controlling lever 187. The clutch remains in action so long as the end of the lever 187 is out of the path of the stop shoulder, and is thrown out of action when the lever is moved into the path of the stop shoulder and arrests the rotation of the disk 185.

The driving members of the clutches 72 are provided with sprocket wheels 188 which are continuously driven during the operation of the machine by a sprocket chain 189 passing over the sprocket wheels, over guide pulleys 190, and about a sprocket wheel 191 which is loosely mounted upon a shaft 192 (Figs. 2, 3, 4 and 6). The sprocket wheel 191 is driven through a bevel gear 193 secured to its hub, and engaged by a bevel pinion 194 secured to a shaft 195. The shaft 195 is driven through the main driving pulley 196 of the machine through a belt 197 passing over a pulley 198 secured to the end of the shaft, and over a pulley 199 connected with the main driving pulley (Fig. 2).

During the cutting, the controller lever 187 is held out of active position against the tension of its actuating spring 200 by a latch 201, the lower end of which is pivoted upon a fixed bar 202 forming a part of the frame of the machine, the latch being held in position to engage the controller lever by a spring 203 (Figs. 4 and 20). The latch 201 is operated to release the controller lever 187 and thus throw the clutch 72 which drives the actuating and controlling mechanism for the cutter head out of operation, by devices which are operated by the cutter head as it completes the cutting of a sole (Figs. 1, 4, 11, 12 and 13). These devices comprise a trip lever 204, the lower end of which is provided with a laterally extending pin 205 adapted to be engaged by the gage finger 28 as the cutter head completes its travel around the pattern. The upper end of the trip lever is connected by a link 206 with one arm of a bell crank lever 207 which is pivoted on the bracket 5 of the vertically movable support 2. The other end of the bell crank lever is connected by a link 208 with one arm of a second lever 209 (Fig. 4). The lever 209 is provided with an arm 210 arranged to engage the latch 201. The trip lever 204 is pivoted upon a supporting arm 211 which is pivoted at 212 to the pattern carrying plate 6, and is forced downward to bring the pin on the trip lever into the path of the gage finger 28 by a spring 213. At the beginning of the cutting operation the pin on the trip lever is held out of the path of the gage finger 28 by a latch 214 pivoted on the free end of the supporting arm 211, and arranged to engage a latch shoulder 215 on the plate 6. The lower end of the latch 214 extends down into the path of the gage finger 28.

Fig. 1 shows the position of the cutter head at the beginning of the cutting operation. At this time the trip lever is held out of the path of the gage finger 28, as indicated in Fig. 11. After the gage finger has traveled about the heel end of the pattern, it strikes the latch 214 and disengages it from the shoulder 215, so that the supporting arm 211 for the trip lever moves downward to bring the trip lever into the path of the gage finger 28. After the gage finger has passed its initial position shown in Fig. 1, it strikes the trip lever and swings the lever in a direction to operate the lever 209, so that it disengages the latch 201 from the clutch controlling lever 187. This releases the controlling lever, so that the clutch is disengaged and the actuating and controlling mechanism for the cutter head thrown out of operation. The travel of the cutter head is thus arrested after it has passed its initial or starting point, and therefore the complete cutting out of the sole is insured. After the travel of the cutter head has been arrested it is returned to its initial or starting position, and the tripping mechanism is reset so that it will not be operated at the beginning of the next cutting operation.

The devices shown for moving the cutter head back to its starting position, and for resetting the tripping devices, comprise a lever 216 which is pivoted to the bracket 5 on the vertically movable support 2, and is provided with a hole 217 through which the rod 206 passes. The lever is also provided with a second hole 218 which surrounds the rear end of a rod 219, the front end of which is connected to the supporting arm 211 of the tripping devices. The rod 206 is provided with a collar 220 arranged at the rear of the lever 216, and the rod 219 is provided with a similar collar 221. The lever 216 is provided with an arm 222 which carries a laterally projecting pin 223 arranged to play between two flanges 224 formed on a stud 225. The stud 225 is adjustably secured in fixed position in a bar 226 forming a part of the frame of the machine. When the support 2 is raised to disengage the cutter heads from the stock, the pin 223 moves idly between the flanges 224, until the knife and feed wheel have been freed from the stock, and then the pin engages the upper flange 224.

During the further upward movement of the support 2, the lever 216 is swung toward the right in Fig. 12. During this movement the lever first strikes the collar 220 on the rod 206 and moves this rod toward the right. This movement of the rod swings the lower end of the trip lever 204 toward the left in Fig. 11, so that the lever acts against the gage finger 28 to move the cutter head back into starting position. This movement of the rod 206 also operates the lever 209 to free the latch 201 so that it may be returned to normal position by its spring when the upward movement of the support 2 has carried the clutch controlling lever 187 above the free end of the latch.

After the lever 216 has moved the rod 206 to return the cutter head to starting position, the lever engages the collar 221 and shifts the rod 219 toward the right. This movement of the rod lifts the arm 211 which carries the trip lever 204 to raise the trip lever out of the path of the gage finger 28, and brings the latch 214 into position to engage the shoulder 215 on the plate 6. The latch is then engaged with the shoulder through the action of a spring 227, and retains the trip lever in position until the latch is again released by the cutter head during the next cutting operation.

Each cutter head operates independently of the other, and one of the heads may therefore remain in action longer than the other. In order that the cutter heads may not be raised until both heads have completed the cutting, the mechanism for raising the support 2 which carries the cutting mechanism is thrown into operation upon the arrest of the cutting mechanism which is the last to finish its cut. In the construction shown, the support 2 for the cutting mechanism is secured upon two guide rods 228 which are supported in bearings 229 formed on the frame of the machine (Fig. 5). The mechanism for raising and lowering the support comprises toggles 230 which are connected by a link 231 and are operated by a crank 232 connected with one of the toggles by a link 233. The crank 232 is secured upon the shaft 192 which is given a half revolution at proper intervals to raise and lower the support 2. The mechanism for actuating the shaft 192 comprises a Horton clutch the driving member 234 of which is formed on the hub of the continuously rotating sprocket wheel 191, which has heretofore been described (Figs. 6 and 20). This driving member is provided with an internal bearing ring 235 for engaging the rolls 236 which are arranged between the driving member and clutching surfaces 237 formed on the driven member 238 of the clutch, which is secured to the crank shaft 192. The roll controlling ring or cage 239 is formed on a sleeve 240 which is loosely mounted on the shaft 192, and is provided with a stop shoulder 241. The stop shoulder coöperates with the hooked end of a clutch controlling lever 242 in the usual manner. The clutch controlling lever 242 is disengaged from the shoulder 241 to throw the clutch into operation through the lever 243 connected with the clutch controlling lever by a link 244 (Fig. 20). The lever 243 is pivoted to the fixed bar 202, and is connected by a link 245 with a second lever 246 which is pivotally supported upon the vertically movable support 2. The lever 246 is acted upon by a spring 247 which tends to move the lever in a direction to raise the clutch controlling lever 242, and thus throw the clutch into operation. The lever 246 is held against the tension of the spring 247 by the engagement of the ends of the lever with controller segments 248 formed on the levers 187 which control the clutches for operating the cutter heads. The ends of the lever 246 are provided with lateral projections adapted to engage notches 249 in the segments 248.

So long as the cutter mechanisms are in operation, the ends of the lever 246 ride on the segments 248. When one of the cutter mechanisms completes its cut and is arrested, the movement of the corresponding controller lever 187 into position to stop its clutch 72 brings the notch 249 into register with the end of the lever 246. The other end of the lever, however, still rides on the other segment 248, until the second cutter mechanism completes its cut and is arrested. The movement of the second controller lever 187 into position to arrest the corresponding cutting mechanism brings the second notch 249 into register with the end of the lever 246, so that the lever is swung about its pivot by the spring 247. This movement of the lever raises the clutch controlling lever 242 so that the clutch members 234 and 238 are connected to impart movement to the crank shaft 192. The crank shaft now makes a half revolution to raise the support 2 and the cutter heads carried thereby, and the clutch is then thrown out by the engagement of a second stop shoulder 241' on the roller cage with the end of the controller lever 242. The end of the controller lever is returned into position to engage the second stop shoulder on the roller cage during the half revolution of the clutch by a cam flange 250 formed on the cage sleeve 240, and arranged to act upon a roll 251 on the controller lever. The controller lever is maintained in engagement with the stop shoulder 241' against the action of the spring 247 until the work supporting table has been shifted and the cutter heads are to be again lowered by devices controlled by the table shifting mechanism, as will be more fully described later on.

After the vertically movable support 2 has been raised to free the cutter heads from the stock, the work supporting table is shifted by mechanism which is thrown into operation by the raising of the support and cutter heads. In the machine shown, the work supporting table consists of a glass plate secured upon a supporting frame 252 which is mounted to reciprocate in guideways 253, the frame being provided with anti-friction rolls 254 for engaging the horizontal and vertical faces of the guideway. The table is provided with an adjustable gage 255 for the rear edge of the rubber sheets, and may also be provided with gages or scales for indicating the proper longitudinal position of the sheets upon the table.

Longitudinal shifting movements are imparted to the table through a rack 256 engaged by a gear 257 which is secured upon a shaft 258. A pinion 259 is secured near the rear end of the shaft 258 (Fig. 6), and is engaged by a rocking gear segment 260 (Figs. 2 and 3). The gear segment is actuated to impart shifting movements to the feed table by a cam 261 mounted upon a stud 262 and operating upon one arm of a lever 263, the other arm of which is connected by a link 264 with the segment. The table operating cam is secured to a worm wheel 265, which is engaged by a worm 266 secured to a shaft 267 on which the main driving pulley 196 of the machine is loosely mounted. The worm shaft 267 is intermittently rotated to actuate the table shifting cam through a Horton clutch 268, which may be of any well-known construction, and is thrown into and out of operation by the raising and lowering of a controlling lever 269. The clutch controlling lever 269 is raised and lowered to throw the clutch into and out of operation, through a rod 270, the upper end of which is connected to one arm of a bell crank lever 271. The other arm of the bell crank lever is connected by a rod 272 with an arm 273 which is secured to a rock shaft 274 through which the throwing into and out of operation of the table shifting mechanism is controlled (Fig. 20). The rock shaft 274 is forced in a direction to throw the table shifting clutch 268 out of operation by a spring 275, and the movement into this position is controlled by an arm 276 secured to the rock shaft, and adapted to engage any one of a series of notches 277 in a controller bar 278 which is carried by the table (Figs. 7 and 21). The rock shaft is rocked in a direction to throw the table shifting clutch into operation when the support 2 for the cutting mechanisms is raised, by means of a hook 279 pivoted on the support 2, and arranged to engage a pin 280 projecting from an arm 281 secured to the rock shaft (Fig. 5). When the shaft 274 is thus rocked to throw the table shifting clutch into operation, it also actuates devices for locking the lever 242 which controls the clutch for raising and lowering the support 2 (Fig. 20). These devices consist of a latch 282 arranged to be swung over a locking shoulder 283 on the clutch controlling lever 242, and normally held out of the path of said shoulder.

The latch 282 is connected with the upper end of the arm 273 by a rod 284.

A spring 285 is interposed between the lever and a shoulder on the rod, and holds the end of the lever against the nuts 286. When the shaft 274 is rocked by the upward movement of the support 2, the clutch controlling lever 242 has been moved into the path of the stop shoulder 241', and the latch 282 is moved into position for the locking shoulder 283 on the lever. During the latter part of the rocking movement of the shaft 274, the spring 285 yields so that the upper end of the lever passes away from the nut 286. The rock shaft is held in position until the shifting movement of the table has been nearly completed. The hook 279 is then operated to release the arm 281 by an arm 287 secured to one end of a rock shaft 288 (Fig. 5). The other end of the rock shaft 288 carries a second arm 289 arranged in the path of a series of trip pins 290 which are carried by a ring 291 connected with the cam 261. When the hook 279 is operated by the engagement of one of the pins 290 with the arm 289 to release the arm 281, the rock shaft 274 is rocked by the spring 275 until the end of the arm 276 engages the top of the controller bar 278. This movement of the rock shaft is not sufficient to throw the clutch 268 out of operation, or to disengage the latch 282 from the clutch controlling lever 242. The table continues to travel until the end of the lever 276 registers with one of the notches 277, and then the rocking movement of the shaft 274 is completed. This final movement of the rock shaft throws the clutch 268 out of operation, thus arresting the movement of the table shifting cam 261, and also releases the clutch controlling lever 242, so that the shaft 192 is given a half revolution to lower the support 2 and reëngage the cutter heads with the stock on the work supporting table. When the support 2 is raised at the completion of the cutting operation, as above described, the clutch controlling levers 187 (Fig. 4) are carried up above the ends of the latches 201, and the latches are freed, so that they move into position beneath the levers. When the support 2 is lowered, the levers 187 are operated by engagement with the latches to throw the clutches 72 into operation, and thus start the actuating and controlling mechanism for the cutter heads.

In the construction shown the table shifting cam 261 is constructed to shift the table into four different cutting positions, and the devices for controlling the rotation of the cam are constructed to rotate the cam through a quarter revolution each time they are thrown into operation. The controller bar 278 is accordingly provided in its upper face with four notches 277 corresponding to the four cutting positions of the table. In some cases, as, for instance, when cutting small size soles, it may be found desirable to shift the work supporting table into more than four different cutting positions, and the controller bar is therefore so mounted that it may be adjusted to bring different parts of its periphery into register with the arm 276 and the different faces of the bar may be provided with varying numbers of notches. As shown, one face of the bar is provided with six notches 277' which may be brought into register with the arm 276, in case six soles are to be cut from each sheet of stock on the work supporting table, instead of four as illustrated. In such case the cam 261 is removed from the machine, and a cam constructed to shift the table into six different positions is substituted.

The controller bar 278 is retained in adjusted position by a latch 292 adapted to engage any one of the series of notches formed in a disk 293 which is secured to the end of the controller bar (Figs. 7 and 21).

In order that the ends of the work supporting table may be alternately moved out into position where the operator may readily replace the cut sheet with a fresh sheet of stock while the cutting heads are operating upon the sheet at the other end of the table, the table shifting mechanism is so constructed that when the movement of the table is reversed it is shifted through a distance sufficient to shift the cutting point from the end of one sheet to the corresponding end of the other sheet. That is to say, the cutting heads are shifted from the left-hand cutting point on one sheet to the left-hand cutting point on the other sheet, and from the right-hand cutting point of a sheet to the right-hand cutting point of the other sheet. In case four soles are cut from each sheet by two cutting heads, as indicated in Fig. 1, the work supporting table will be shifted from the position indicated in Fig. 1 toward the right to cut the second pair of soles from the sheet S', and will then be shifted toward the left until the cutting mechanism No. 2 registers with the medallion H at the left of sheet S to cut the first pair of soles from the sheet S, and will then be shifted again toward the left to cut the second pair of soles from the sheet S. The shifting movement of the table will then be reversed, and the table will be shifted toward the right into the position indicated in Fig. 1 to cut the first pair of soles from the sheet S'. During the cutting of both pair of soles from the sheet S', therefore, the table will be in such position that the sheet S from which the soles have been previously cut may be removed from the table, and a fresh sheet substituted therefor. While the soles are being cut from the sheet S, the table will be in position so that the sheet S' may be removed, and a fresh sheet substituted.

The work supporting table is moved into a definite position each time it is shifted, and if the stock to be cut is not provided with medallions or other marks which should be located in a definite position on the cut sole, the shifting movements of the table may be relied upon to properly position the stock to the cutting heads. In cutting stock provided with medallions, however, the positions of the medallions may vary, owing to the stretching of the stock, or to variations in the positions of different sheets upon the work supporting table. Means is accordingly provided for accurately positioning the cutting mechanism with relation to the stock.

In the construction shown the accurate positioning of the cutting mechanisms is effected by means of projections on the stock which control the positions of the cutting mechanisms with relation to the stock. As shown in Figs. 11, 15, 16 and 17, the pattern supporting plate 6 of the cutting mechanism carries a depending arm 294, the lower end of which carries a finger 295 which is adjusted to be engaged by one of a series of lugs 296 formed on the sheet of stock. The finger 295 projects from a sleeve 297 which is loosely mounted on a vertically movable rod 298 carried by the arm 294. The finger 295 is arranged to play between two shoulders 299 formed on an arm 300 which is secured to the rod 298. The arm 300 is also provided with a pin 301 which enters a vertical slot 302 formed in the arm 294 and holds the rod 298 against rotation. When the table is shifted, one of the lugs 296 engages the finger 295 and shifts it in the direction of the movement of the table, thus shifting the pattern carrying arm into position to bring the pattern into proper register above the medallion (or other parts of the sole) corresponding to the lug 296. The shoulders 299 are so arranged that the finger 295 is properly positioned in coöperating with either side of the lug 296 according to the direction in which the table is being shifted.

In order that the finger 295 may pass idly over the lugs 296, other than the one with which it should be engaged, devices are provided for raising and lowering the finger 295, and for properly controlling and timing its movement. During the cutting, the sleeve 297 carrying the finger 295 is held in engagement with the hub of the arm 300 by a spring 303 interposed between the upper end of the sleeve and a collar 304 secured to the rod 298. The vertical position of the finger at this time is determined by a vertically movable bar 305 extending along the front side of the table and engaging a roll 306 carried by the arm 300. The lower end of the rod 298 is supported in a bearing at the lower end of the arm 294, and the upper end is supported in a plunger 307 which is mounted in a bearing 308 on the arm 294. A spring 309 is interposed between the upper end of the rod 298 and the plunger, and acts to hold the upper end of the plunger in engagement with a bar 310 which forms a part of the frame of the machine. When the cutter head and pattern are raised, the sleeve 297 is also raised to lift the finger 295 out of the path of the lugs 296 by a hook 311 pivoted on the arm 294 and engaging a flange 312 on the sleeve 297. During this upward movement of the sleeve 297 and finger 295, the rod 298 remains stationary, since its vertical position is determined by the bar 305.

The position of the parts, after the cutting mechanism has been lifted, and before the shifting movement of the table begins, is shown in full lines in Fig. 16. At the beginning of the shifting movement of the table, the bar 305 is raised into the position indicated in dotted lines in Fig. 16. This movement of the bar raises the rod 298 and causes a cam surface 313 on the collar 304 to act on a pin 314 carried by a lever 315 which is pivoted to the plunger 307, and is arranged to engage a second pin 316 projecting from a hook 311. The action of the cam 313 on the pin 314 causes the hook 311 to be disengaged from the flange 312 so that the sleeve 297 carrying the finger 295 is free to descend until arrested by the hub of the arm 300. At this time the hub of the arm 300 is in such position that the downward movement of the finger is arrested before the finger is brought into the path of the lugs 296. This position of the bar 305 and finger 295 is indicated in dotted lines in Fig. 16. During the latter part of the shifting movement of the table, and before the positioning lug 296 reaches the finger 295, the bar 305 is dropped into the position indicated in Fig. 15, thus bringing the positioning finger into the path of the lug 296. If the movement of the table is in a direction opposite to that in which it was moved during the previous shifting movement, the finger 295 will be shifted from one stop shoulder 299 to the other by the frictional engagement of a light spring 317 with the upper surface of the work supporting table.

The mechanism for raising and lowering the controller bar 305 consists of a notched shaft 318 which is mounted in fixed bearings and extends along the front of the work supporting table (Figs. 1, 7, 8, 18 and 19). The bar 305 is supported upon two or more bell crank levers 319 which are pivoted to the work supporting table, and are connected by a rod 320 so that they will move in unison. The bar is supported by a roll 321 which is arranged to ride along the upper surface of the shaft 318 during the shifting movements of the table. The shaft 318 is provided with four depressions 322, 323, 324 and 325, corresponding to the four positions of the work supporting table. The depressions 322 and 324 correspond to the positions of the table during the cutting of the first pair of soles from the sheet S′ and sheet S respectively, while the depressions 323 and 325 correspond to the positions of the table in cutting the second pairs of soles. When the parts are in the position indicated in Fig. 1, the roll 321 will lie in the recess 322 in the rock shaft 318. When the table is shifted to the right, preparatory to cutting the second pair of soles from the sheet S′, the roll 321 will ride out of the recess 322, thus raising the bar 305 into position to release the positioning finger 295 and support it in the dotted line position of Fig. 16, as heretofore described. Shortly before the shifting movement of the table is completed, the roll 321 will drop into recess 323, thus lowering the positioning fingers 295 so that they will be engaged by the lugs 296 corresponding to the medallions of the second pair of soles to be cut from the sheet S′. When the table is next shifted, its motion will be reversed, and it will be shifted toward the left in Fig. 1. At the beginning of this shifting movement the shaft 318 will be rocked through an angle of 90°. This movement of the shaft will carry the recess 322 out of position to be engaged by the roll 321, and will bring the recess 324 into position to be engaged by the roll, the recess 322 being at the side of the shaft after it has been turned, and the recess 324 being at the top of the shaft. The recesses 323 and 325 are so formed that they extend along the top of the shaft in both of its positions. After the shaft has been thus rocked, the roll 321 will travel along the shaft from the recess 323 to the recess 324 during the first shifting movement of the table toward the left, so that the locating fingers will be held out of the path of all the lugs on the sheet S′, and will be lowered into position to be engaged by the lugs corresponding to the medallions of the first soles to be cut from the sheet S. During the latter part of the next shifting movement of the table toward the left, the roll 321 will ride out of the recess 324 and into the recess 325. At the beginning of the next shifting movement of the table, which will be toward the right, the shaft 318 will be rocked to return it to the position indicated in Fig. 8, and the roll 321 will travel along the shaft from recess 325 to recess 322 during this shifting movement of the table.

The shaft 318 is rocked when the movement of the work supporting table is reversed through a rock shaft 326 provided at one end with an arm 327 which is connected by a link 328 with an arm 329 secured to the rock shaft 318 (Figs. 7, 18 and 19). The other end of the rock shaft 326 carries a bevel pinion 330 which is engaged by a bevel gear 331 secured to a sleeve 332 loosely mounted on the end of the shaft 258. The sleeve 332 is connected to the shaft 258 by a friction clutch consisting of a disk 333 formed on a sleeve secured to the shaft and engaged on opposite sides by a flange 334 on the sleeve 332 and a disk 335. The flange 334 and disk 335 are held in frictional engagement with opposite sides of the flange 333 by bolts 336 and springs 337. When the motion of the shaft 258 is reversed in shifting the work supporting table, the shaft 330 is rocked through the friction clutch described to rock the shaft 318, and then the clutch slips idly during the subsequent movement of the table in that direction.

In order to increase the range of the devices for correcting the position of the cutting mechanisms, means is provided for shifting the cutting mechanisms in a direction opposite to the direction in which the work supporting table is shifted. The locating fingers which correct the position of the cutting mechanisms are by this means moved to meet the lugs on the stock so that the cutting mechanisms will be correctly positioned by the lugs, in case the lugs and medallions are so far out of proper position that the lugs would not otherwise engage the positioning fingers. In the construction shown, this means comprises a longitudinally movable bar 338 which is connected to shift the pattern carrying arms 4 by yokes 339. Each of these yokes is provided with two depending arms 340 arranged on opposite sides of a lug 341 which projects upward from the front end of the arm 4. A rod 342 is secured in the arms 340 of the yoke, and extends through a slot 343 in the lug 341. The rod 342 carries two sleeves 344 which are arranged to engage opposite sides of the lug 341, and are held in engagement therewith by springs 345. A sleeve 346 is secured to the middle of the rod 342 and serves to center the sleeves 344 on the rod.

The bar 338 is shifted in a direction opposite to the direction in which the work supporting table is moved whenever the direction of movement of the table is reversed. The mechanism for thus shifting the bar consists of a bell crank lever 347, one arm of which is connected by a link 348 with the bar 338, and the other arm of which is connected by a link 349 with a bell crank lever 350 (Figs. 7, 13, 18 and 19). The bell crank lever 350 is connected with a crank pin 351 on the flange 334 by a link 352. Through these connections the bar 38 is shifted longitudinally whenever the motion of the shaft 58 is reversed in reversing the shifting movement of the work supporting table. When the bar 338 is shifted toward the left, for instance, in Fig. 14, the pattern carrying arm will be shifted toward the left or in a direction opposite to the shifting movement of the table. When the positioning lug strikes the positioning finger, the pattern carrying arm will be moved toward the right to correct its position, the right-hand spring 345 yielding to allow this correcting movement of the pattern carrying arm. When the cutter heads are again raised, and the positioning finger raised above the lug on the stock, the spring 245 will shift the pattern carrying arm toward the left, or back to its central position on the rod 342, preparatory to the next correcting movement of the arm. When the bar 338 is shifted toward the right, a similar operation of the parts takes place, the left-hand spring 345 yielding during the correcting movements of the pattern carrying arm.

When it is desired to change the positions of the pattern carrying arms to vary the distance between the two cutting mechanisms, or to bring the cutting mechanisms into proper relation to the stock on the table, the yokes 339 may be adjusted along the bar 338 and then secured in adjusted position by means of the clamping screws 353. An adjustment of the yokes along the bar will change the angle at which the patterns extend across the work supporting table, and the positions of the patterns may be corrected by an adjustment of the pattern carrying plate 6 about its pivot 11 in the manner already described.

After the positions of the patterns have been corrected by the engagement of the lugs with the positioning fingers in the manner above described, the cutter heads are engaged with the stock, and the cutting begins. During the cutting the pattern carrying arms are firmly clamped or locked in position by clamping devices arranged to engage a plate 354 formed at the front end of the pattern carrying arm 4 (Figs. 11 and 13). The clamping devices consist of a lower clamping jaw 355 formed on a slide 356 which is mounted for vertical movement in guideways in a part 357 of the frame of the machine. The upper jaw 358 of the clamping device is secured to a rod 359 mounted for vertical movement in the slide 356, and forced downward by a spring 360. The upper jaw is raised to release the pattern carrying arm when the arm is raised to free the cutter heads from the stock by a fixed cam 361 operating upon the lower end of a lever 362. The upper end of the lever is provided with an arm 363 for engaging and lifting the jaw 358 of the clamping device. When the pattern carrying arm is raised, the clamping jaw is moved away from the jaw 355 to release the pattern carrying arm, and when the pattern carrying arm is lowered the jaw 358 is released so that the pattern carrying arm is firmly clamped during the cutting operation.

In order to relieve the pivotal supports of the pattern carrying arms from cramping strain which might interfere with the lateral shifting of the pattern carrying arms by the correcting mechanism, means is provided for supporting the front ends of the arms. In the construction shown this means comprises the lower jaw 355 of the clamping devices and a link 364 which connects the slide 356 with an arm 365 secured to a rock shaft 366 which is mounted in fixed bearings in the frame of the machine. The rock shaft is provided at one end with an arm 367 which is connected by a link 368 with one arm of a bell crank lever 369. The other arm of the bell crank lever is connected by a link 370 with one of the brackets 5 on the vertically movable support 2. Through these connections the slides 356 are raised and lowered in unison with the support 2 so that the lower jaws 355 support the front ends of the pattern carrying arms 4 as they are raised and lowered during the operation of the machine.

While the machine shown and described is provided with two cutting mechanisms, it will be understood that this is not essential, and that various features of the invention may be embodied in machines provided with a single cutting mechanism, and that other features of the machine may be embodied in machines provided with more than two cutting mechanisms. It will also be understood that the various features of the invention are not limited in their application to machines in which the relative shifting movements between the cutting mechanism or mechanisms and the stock are effected by movement of the work supporting table, but may be embodied in machines in which such relative shifting movement is otherwise effected. It will also be understood that the specific construction and specific mode of operation of the cutting mechanisms is not material, except so far as it may be set forth in the claims. It will also be understood that various features of the invention are not limited in their application to machines in which the mechanism or mechanisms for operating upon the material are cutting mechanisms, but may be embodied in machines provided with other forms of operating mechanisms.

Having explained the nature and object of the invention, and specifically described one form of machine in which it may be embodied, what I claim is:—

1. A machine for cutting sheet material, having, in combination, cutting mechanism comprising a cutter carrying head, a pattern, means for engaging the material for causing the head to travel about the pattern, a work supporting table, and mechanism acting automatically to relatively shift the table and cutting mechanism to present different portions of the material successively to the cutting mechanism, substantially as described.

2. A machine for cutting sheet material, having, in combination, a cutter, means for acting on the material to cause a travel of the cutter along the material, and means for holding down the material directly in front of the cutter, substantially as described.

3. A machine for cutting sheet material, having, in combination, a cutter, means for acting on the material to cause a travel of the cutter along the material, and means for intermittently applying pressure to the material directly in front of the cutter, substantially as described.

4. A machine for cutting sheet material, having, in combination, a cutter, means for acting on the material to cause a travel of the cutter along the material, and an intermittently operating presser foot in front of the cutter, substantially as described.

5. A machine for cutting sheet material, having, in combination, a cutter, means for causing a travel of the cutter along the material, a presser foot in front of the cutter mounted for relative movement toward and from the cutter, and mechanism for intermittently raising and lowering the presser foot during the travel of the cutter, substantially as described.

6. A machine for cutting sheet material, having, in combination, a cutter head, a knife carried thereby, a feed wheel mounted in the head for feeding the head along the material, a presser foot in front of the knife, and mechanism for actuating the presser foot to intermittently apply pressure to the material being cut, substantially as described.

7. A machine for cutting sheet material, having, in combination, a work supporting table, a cutter head mounted for bodily movement over the table, a feed wheel for engaging the material and feeding the head, a spring pressed carrier for the wheel, and a spring pressed knife carrier in the head, substantially as described.

8. A machine for operating on sheet material, having, in combination, a tool, a pattern, a gage connected with the tool and bearing against the pattern, means for acting on the material to keep the gage in contact with the pattern during the relative movement of the tool and material, and yielding means for retaining the gage in contact with the pattern, substantially as described.

9. A machine for operating on sheet material, having, in combination, a traveling tool, a pattern, a gage connected with the tool and bearing against the pattern, means for acting on the material to cause the gage to travel along the pattern, and means for retaining the gage in engagement with the pattern when the feeding means is disengaged from the material, substantially as described.

10. A machine for operating on sheet material, having, in combination, a tool, a pattern, a gage connected with the tool and bearing against the pattern, a feeler engaging the pattern, mechanism controlled by the feeler for causing the gage to travel along the pattern, and means for retaining the gage in contact with the pattern, substantially as described.

11. A machine for operating on sheet material, having, in combination, a traveling tool, a pattern provided with a marginal flange, a gage connected with the tool and bearing against the periphery of the pattern, means for acting on the material to cause the gage to travel along the pattern, and a spring pressed arm engaging the flange to hold the gage against the pattern, substantially as described.

12. A machine for operating on sheet material, having, in combination, a plurality of independently operating mechanisms for acting simultaneously on the material, and mechanism rendered active upon the completion of the operation of all said mechanisms for relatively shifting said mechanisms and the material, substantially as described.

13. A machine for cutting sheet material, having, in combination, a plurality of simultaneously and independently actuated cutting mechanisms, and mechanism rendered active upon the completion of the cutting by the mechanism which was the last to complete its cut for relatively shifting the material and cutting mechanisms, substantially as described.

14. A machine for cutting sheet material, having, in combination, a plurality of traveling cutters, actuating mechanisms for feeding the cutters in paths corresponding to the outlines of the articles to be cut out, means for arresting the travel of each cutter as it completes its cut, and mechanism rendered active upon the arrest of the cutter last in action for relatively shifting the cutting mechanisms and material, substantially as described.

15. A machine for cutting sheet material, having, in combination, a plurality of traveling cutter heads, a corresponding number of patterns, a feed wheel in each cutter head for engaging the material to be cut, mechanism for actuating the feed wheels to cause the heads to travel about the patterns, devices for arresting each head as it completes its travel about a pattern, and mechanism rendered active upon the arrest of the last head for relatively shifting the cutter heads and material, substantially as described.

16. A machine for cutting sheet material, having, in combination, a plurality of traveling cutter heads, a corresponding number of patterns, a feed wheel in each cutter head for engaging the material to be cut, mechanism for actuating the feed wheels to cause the heads to travel about the patterns, devices for arresting each head as it completes its travel about a pattern, and mechanism rendered active upon the arrest of the last head to disengage the heads from the material and shift the material with relation to the cutting heads, substantially as described.

17. A machine for cutting sheet material, having, in combination, a work supporting table, a plurality of cutters mounted to travel over the table, actuating mechanism for feeding the cutters in paths corresponding to the outlines of the articles to be cut out, means for arresting the travel of each cutter as it completes its cut, and mechanism rendered active upon the arrest of the cutter last in action for shifting the work supporting table, substantially as described.

18. A machine for cutting sheet material, having, in combination, a work supporting table, a plurality of cutters mounted to travel over the table, actuating mechanisms for feeding the cutters in paths corresponding to the outlines of the articles to be cut out, means for arresting the travel of each cutter as it completes its cut, and mechanism rendered active upon the arrest of the cutter last in action for disengaging the cutters from the material and shifting the work supporting table, substantially as described.

19. A machine for cutting sheet material, having, in combination, a work supporting table, a plurality of cutter heads mounted to travel over the table, a corresponding number of patterns, a feed wheel in each cutter head, mechanism for actuating the feed wheels to cause the heads to travel about the patterns, devices for arresting each head as it completes its travel about a pattern, and mechanism rendered active upon the arrest of the last head to disengage the cutters from the material and shift the work supporting table, substantially as described.

20. A machine for operating on sheet material, having, in combination, a work supporting table, mechanism for operating on sheets carried by the table, and intermittently operating mechanism for relatively shifting the table and operating mechanism in one direction when operating on one end of the table and in the opposite direction when operating on the other end of the table, substantially as described.

21. A machine for operating on sheet material, having, in combination, a reciprocating work supporting table, mechanism for operating on sheets carried by the table, and mechanism for intermittently shifting the table step by step in one direction when operating on one end of the table, and step by step in the opposite direction when operating on the other end of the table, substantially as described.

22. A machine for operating on sheet material, having, in combination, a work supporting table, a cutting mechanism for operating on sheets carried by the table, mechanism for intermittently disengaging the cutting mechanism from the material, and intermittently operating mechanism for relatively shifting the cutting mechanism and table while the cutting mechanism is disengaged to transfer the cutting mechanism in one direction over one end of the table and in the opposite direction over the other end of the table, substantially as described.

23. A machine for operating on sheet material, having, in combination, a work supporting table, a cutting mechanism for operating on sheets carried by the table, and mechanism for intermittently shifting and reversing the table to transfer the cutting mechanism from the right side of the medial line of the table toward the right and from the left side of said line toward the left, substantially as described.

24. A machine for operating on sheet material, having, in combination, a cutting mechanism, means for presenting sheet material to the cutting mechanism, and mechanism controlled from the material for laterally varying the position of the cutting mechanism, substantially as described.

25. A machine for cutting sheet material, having, in combination, a work support, a cutting mechanism, mechanism for relatively shifting the cutting mechanism and work support to present different portions of the material successively to the cutting mechanism, and devices controlled from the material for determining the lateral position of the cutting mechanism, substantially as described.

26. A machine for cutting sheet material, having, in combination, a work support, a cutting mechanism, mechanism for shifting the work support to present different portions of the material successively to the cutting mechanism, and mechanism for shifting the cutting mechanism laterally to correct its position with relation to the material after each shift of the work support, substantially as described.

27. A machine for cutting sheet material, having, in combination, a traveling cutter, means for feeding the cutter in a path corresponding to the outline of the article to be cut out, a work support, mechanism for relatively shifting the cutting mechanism and work support to present different portions of the material successively to the cutting mechanism, and mechanism controlled from the material for determining the position of the cutting mechanism over the work support, substantially as described.

28. A machine for cutting sheet material, having, in combination, a traveling cutter, means for feeding the cutter in a path corresponding to the outline of the article to be cut out, a work supporting table, mechanism for shifting the work supporting table to present different portions of the material to the cutting mechanism, and devices controlled by projections on the material for determining the position of the cutting mechanism after each shift of the table, substantially as described.

29. A machine for cutting sheet material, having, in combination, a cutter, a pattern and mechanism for feeding the cutter in a path corresponding to the outline of the pattern, a work support, mechanism for shifting the work support, and mechanism for positioning the cutting mechanism over the work support to register with a design on the material, substantially as described.

30. A machine for cutting sheet material, having, in combination, a cutting mechanism, means for presenting sheet material thereto, and mechanism controlled by projections on the material which correspond to designs thereon for positioning the cutting mechanism to register with the design, substantially as described.

31. A machine for cutting sheet material, having, in combination, a traveling cutter, means for feeding the cutter in a path corresponding to the outline of the article to be cut, a work support, mechanism for shifting the work support to present different portions of the material to the cutting mechanism, and devices controlled by projections on the material for causing the cutting mechanism to shift with the work support to correct inaccuracies in the position of the material upon the table, substantially as described.

32. A machine for cutting sheet material, having, in combination, a work support, a cutting mechanism for cutting out articles from the material carried on the work support, means for shifting the work support to present different portions of the material to the cutting mechanism, devices controlled by projections on the material for determining the position of the cutting mechanism over the work support, and means for moving said devices to meet the projections during the shifting movements of the work support, substantially as described.

33. A machine for cutting sheet material, having, in combination, a work support, a cutting mechanism for cutting out articles from the material carried on the work support, means for shifting the work support to present different portions of the material to the cutting mechanism, devices controlled by projections on the material for determining the position of the cutting mechanism over the work support, and means for moving the cutting mechanism and positioning devices in a direction opposite to the movement of the work support during each shifting movement of the work support, substantially as described.

34. A machine for cutting sheet material, having, in combination, a cutting mechanism, a work support, mechanism for intermittently operating the cutting mechanism, mechanism for shifting the work support between successive operations of the cutting mechanism, devices for shifting the cutting mechanism to correct its position with relation to the material, and means for securing the cutting mechanism in position during the cutting, substantially as described.

35. A machine for cutting sheet material, having, in combination, a traveling cutter head, mechanism for feeding the head in a path corresponding to the outline of the article to be cut out, and mechanism for arresting the travel of the head and disengaging the cutter from the material, substantially as described.

36. A machine for cutting sheet material, having, in combination, a traveling cutter head, mechanism for feeding the head by engagement with the material in a path corresponding to the outline of the articles to be cut out, and mechanism for disengaging the cutter from the material and relatively shifting the cutter head and material and reëngaging the cutter with the material, substantially as described.

37. A machine for cutting sheet material, having, in combination, a traveling cutter head, mechanism for feeding the head in a path corresponding to the outline of the article to be cut out, mechanism for stopping the travel of the head upon the completion of the article, and mechanism for disengaging the cutter from the material, for relatively shifting the cutter head and material, reëngaging the cutter with the material, and starting the feed of the head, substantially as described.

38. A machine for cutting sheet material, having, in combination, a pattern, a cutter head, mechanism for causing the head to travel about the pattern, and mechanism operating to arrest the travel of the cutter and disengage the cutter from the material, substantially as described.

39. A machine for cutting sheet material, having, in combination, a pattern, a cutter head, a feed wheel mounted in the head, mechanism for actuating the feed wheel to feed the head about the pattern, and devices controlled by the head for arresting said mechanism, substantially as described.

40. A machine for cutting sheet material, having, in combination, a pattern, a cutter head, mechanism for causing the head to travel about the pattern, tripping devices operated by the head to throw said mechanism out of operation, means for rendering the trip inactive, and devices operated by the cutter head as it travels about the pattern to re-set the tripping devices, substantially as described.

41. A machine for cutting sheet material, having, in combination, a pattern, a cutter head, mechanism for feeding the cutter head about the pattern, tripping devices operated by the head to throw said mechanism out of operation, mechanism for disengaging the cutter from the material and relatively shifting the material and cutter head, and mechanism for reëngaging the cutter and starting the feeding mechanism, substantially as described.

42. A machine for cutting sheet material, having, in combination, a traveling cutter head, mechanism for relatively shifting the cutter head and material, and mechanism for engaging and disengaging the cutter with the material controlled by the head to disengage the cutter at the completion of the cut, and controlled by the shifting mechanism to engage the cutter with the material at the completion of the shifting movement, substantially as described.

43. A machine for cutting sheet material, having, in combination, a cutter head, a work supporting table, mechanism for causing a relative movement of the cutter head and table to cut an article from the material on the table, mechanism for engaging the cutter with and disengaging it from the material, controlling devices actuated by the cutter head to stop the relative travel of the cutter and table and cause the cutter to be disengaged from the material, and controlling devices actuated upon the disengagement of the cutter from the material to start the shifting mechanism and actuated upon the arrest of the shifting mechanism to cause reëngagement of the cutter with the material, substantially as described.

44. A machine for cutting sheet material, having, in combination, a pattern, a cutter head, mechanism for causing the cutter head to travel about the pattern, a work supporting table, mechanism for arresting the travel of the cutter head and disengaging the cutter from the material on the work support, mechanism for shifting the work support, and mechanism for reëngaging the cutter and starting the travel of the cutter about the pattern, substantially as described.

45. A machine for cutting sheet material, having, in combination, a traveling cutter, means for feeding the cutter in a path corresponding to the outline of the article to be cut out, means for arresting the travel of the cutter after it has passed its initial position, and mechanism for disengaging the cutter from the material and returning it to its initial position, substantially as described.

46. A machine for cutting sheet material, having, in combination, a cutter head provided with means for feeding the head by engagement with the material in a path corresponding to the outline of the article to be cut out, mechanism for arresting the feeding means after the head has passed its initial position, and mechanism for disengaging the feeding means from the material and returning the head to its initial position, substantially as described.

47. A machine for cutting sheet material, having, in combination, a traveling cutter head, means for feeding the head by engagement with the material in a path corresponding to the outline of the article to be cut, mechanism for intermittently raising and lowering the cutterhead, and mechanism for shifting the material while the cutter head is raised, substantially as described.

48. A machine for cutting sheet material, having, in combination, a traveling cutter head, means for feeding the head by engagement with the material in a path corresponding to the outline of the article to be cut, and mechanism for arresting the travel of the head and disengaging the cutter from the material, substantially as described.

49. A machine for cutting sheet material, having, in combination, a traveling cutter head, means for feeding the head by engagement with the material in a path corresponding to the outline of the article to be cut, mechanism for stopping the travel of the head upon the completion of the article, and mechanism for disengaging the material and cutter, for relatively shifting the cutter head and material, reëngaging the cutter with the material, and starting the feed of the head, substantially as described.

50. A machine for cutting sheet material, having, in combination, a pattern, a cutter head, means engaging the material for causing the cutter head to travel about the pattern, a work supporting table, mechanism for arresting the travel of the cutter head and disengaging the cutter from the material on the work supporting table, mechanism for shifting the work supporting table, and mechanism for reëngaging the cutter with the material and starting the travel of the cutter about the pattern, substantially as described.

ERASTUS E. WINKLEY.

Witnesses:
N. D. McPhail,
Warren G. Ogden.

Copies of this patent may be obtained for five cents each, by addressing the "Commissioner of Patents, Washington, D. C."